United States Patent
Zhang et al.

(10) Patent No.: US 12,402,110 B2
(45) Date of Patent: Aug. 26, 2025

(54) NON-CONTIGUOUS RESOURCE BLOCKS FOR BANDWIDTH PART CONFIGURATION

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/886,408

(22) Filed: Aug. 11, 2022

(65) Prior Publication Data
US 2024/0057050 A1 Feb. 15, 2024

(51) Int. Cl.
*H04W 72/0453* (2023.01)
*H04L 5/14* (2006.01)
*H04W 72/0446* (2023.01)

(52) U.S. Cl.
CPC ........... *H04W 72/0453* (2013.01); *H04L 5/14* (2013.01); *H04W 72/0446* (2013.01)

(58) Field of Classification Search
CPC .. H04L 5/14; H04W 72/0446; H04W 72/0453
See application file for complete search history.

(56) References Cited

U.S. PATENT DOCUMENTS

2019/0289668 A1* 9/2019 He .................. H04L 5/0092
2021/0314946 A1 10/2021 Ang et al.
(Continued)

OTHER PUBLICATIONS

Ericsson: "Sub-band Non-overlapping Full Duplex", 3GPP TSG-RAN WG1 Meeting #109-e, R1-2204107, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 10 Pages, XP052143999, Section 3, Figure 3.
(Continued)

*Primary Examiner* — Donald L Mills
(74) *Attorney, Agent, or Firm* — Holland & Hart LLP

(57) ABSTRACT

Methods, systems, and devices for wireless communications are described. Example wireless communications systems may implement control signaling configuring a user equipment (UE) to communicate in a subband full-duplex (SBFD) mode. An SBFD mode may include a non-contiguous bandwidth part (BWP), and control signaling may indicate the resource blocks (RB)s included in the non-contiguous BWP. In some cases, the non-contiguous BWP may be for communications between the UE and the network in one communications direction (e.g., uplink or downlink), and another BWP may be configured for communications between the UE and the network in the other communications direction. The non-contiguous BWP may include two subbands, and the other BWP may be non-overlapping with (e.g., positioned between) the two subbands in the frequency domain. The network may configure a BWP time domain switching pattern (e.g., switching between SBFD and half-duplex modes according to a BWP time domain switching pattern).

30 Claims, 17 Drawing Sheets

(56) References Cited

U.S. PATENT DOCUMENTS

| | | | |
|---|---|---|---|
| 2021/0329646 A1 | 10/2021 | Fakoorian et al. | |
| 2023/0076137 A1* | 3/2023 | Cozzo | H04L 5/14 |
| 2023/0139455 A1* | 5/2023 | Chatterjee | H04W 72/0457 |
| | | | 370/329 |
| 2024/0155671 A1* | 5/2024 | Kalbasi | H04W 74/006 |
| 2025/0047454 A1* | 2/2025 | Jung | H04L 5/0094 |

OTHER PUBLICATIONS

International Search Report and Written Opinion—PCT/US2023/024857—ISA/EPO—Sep. 26, 2023

* cited by examiner

NON-CONTIGUOUS RESOURCE BLOCKS FOR BANDWIDTH PART CONFIGURATION

FIELD OF TECHNOLOGY

The following relates to wireless communications, including non-contiguous resource blocks for bandwidth part configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support non-contiguous resource blocks (RB)s for bandwidth part (BWP) configuration. For example, the described techniques provide for control signaling configuring a user equipment (UE) to communicate with the network in a subband full-duplex (SBFD) mode. An SBFD mode may include a non-contiguous BWP, and control signaling may indicate the RBs included in the non-contiguous BWP. In some cases, the non-contiguous BWP may be configured for communications between the UE and the network in one communication direction (e.g., uplink or downlink), and another BWP may be configured for communications between the UE and the network in the other communication direction. The non-contiguous BWP may include two subbands, and the other BWP may be non-overlapping with (e.g., positioned between) the two subbands in the frequency domain. In some cases, the control signaling may indicate the RBs in each BWP by including an array for each BWP indicating the RBs included in that BWP (which may be non-contiguous in the frequency domain). In some cases, the control signaling may indicate the RBs in each BWP by including an indication of the subbands in each BWP, the beginning RB index for each subband, and the number of RBs in each subband. In some cases, the control signaling may indicate the RBs in each BWP by including a bitmap for each BWP indicating the RBs included in that BWP. Additional control signaling, for example a medium access control (MAC) control element (MAC-CE) or a downlink control information (DCI) message, may update the RBs associated with one or more BWP and/or subband. In some cases, the network may configure a BWP time domain switching pattern. For example, the network may configure communications to switch between SBFD and half-duplex modes according to a BWP time domain switching pattern.

A method for wireless communications at a UE is described. The method may include receiving, from a network entity, control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain and communicating with the network entity in a SBFD mode in the first communication direction via the first BWP and in the second communication direction via the second BWP.

An apparatus for wireless communications at a UE is described. The apparatus may include a processor, memory coupled with the processor, and instructions stored in the memory. The instructions may be executable by the processor to cause the apparatus to receive, from a network entity, control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain and communicate with the network entity in a SBFD mode in the first communication direction via the first BWP and in the second communication direction via the second BWP.

Another apparatus for wireless communications at a UE is described. The apparatus may include means for receiving, from a network entity, control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain and means for communicating with the network entity in a SBFD mode in the first communication direction via the first BWP and in the second communication direction via the second BWP.

A non-transitory computer-readable medium storing code for wireless communications at a UE is described. The code may include instructions executable by a processor to receive, from a network entity, control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain and communicate with the network entity in a SBFD mode in the first communication direction via the first BWP and in the second communication direction via the second BWP.

In some examples of the method, apparatuses, and non-transitory computer-readable medium described herein, receiving the control signaling may include operations, features, means, or instructions for receiving an indication of a first identifier associated with the first BWP, receiving an indication that the first BWP may be associated with the first communication direction, and receiving, for the first BWP, an indication of the first set of RBs and the second set of RBs from a set of multiple RBs associated with at least one carrier bandwidth that includes the first BWP.

In some examples of the method, apparatuses, and non-transitory computer-readable medium described herein, receiving the control signaling may include operations, features, means, or instructions for receiving an indication of a second identifier associated with the second BWP, receiving an indication that the second BWP may be associated with the second communication direction, and receiving, for the second BWP, an indication of the third set of RBs from the set of multiple RBs.

In some examples of the method, apparatuses, and non-transitory computer-readable medium described herein, the first identifier may be equal to the second identifier.

In some examples of the method, apparatuses, and non-transitory computer-readable medium described herein, the first identifier may be different from the second identifier.

In some examples of the method, apparatuses, and non-transitory computer-readable medium described herein, receiving the control signaling may include operations, features, means, or instructions for receiving an indication of a first identifier associated with the first BWP, receiving an indication that the first BWP may be associated with the first communication direction, receiving, for the first subband, an indication of a beginning RB index of the first set of RBs and a size in RBs of the first set of RBs, and receiving, for the second subband, an indication of a beginning RB index of the second set of RBs and a size in RBs of the second set of RBs.

In some examples of the method, apparatuses, and non-transitory computer-readable medium described herein, receiving the control signaling may include operations, features, means, or instructions for receiving an indication of a second identifier associated with the second BWP, receiving an indication that the second BWP may be associated with the first communication direction, and receiving, for the second BWP, an indication of a beginning RB index of the third set of RBs and a size in RBs of the third set of RBs.

In some examples of the method, apparatuses, and non-transitory computer-readable medium described herein, receiving the control signaling may include operations, features, means, or instructions for receiving an indication of a first identifier associated with the first BWP, receiving an indication that the first BWP may be associated with the first communication direction, and receiving a bitmap for the first BWP indicating the first set of RBs and the second set of RBs.

In some examples of the method, apparatuses, and non-transitory computer-readable medium described herein, receiving the control signaling may include operations, features, means, or instructions for receiving an indication of a second identifier associated with the first BWP, receiving an indication that the second BWP may be associated with the second communication direction, and receiving a second bitmap for the second BWP indicating the third set of RBs.

Some examples of the method, apparatuses, and non-transitory computer-readable medium described herein may further include operations, features, means, or instructions for receiving second control signaling indicating a set of BWPs, the set of BWPs including a first subset of BWPs associated with non-contiguous RBs and a second subset of BWPs associated with contiguous RBs, the first subset of BWPs including the first BWP and the second BWP, and where receiving the control signaling includes receiving an indication that a set of slots may be associated with the first BWP and the second BWP.

Some examples of the method, apparatuses, and non-transitory computer-readable medium described herein may further include operations, features, means, or instructions for receiving third control signaling updating RBs associated with at least one of the first BWP, the second BWP, a third BWP of the second subset of BWPs, or a fourth BWP of the second subset of BWPs, where the third BWP may be associated with the first communication direction and where the fourth BWP may be associated with the second communication direction, where the first subset of BWPs includes only the first BWP and the second BWP, and where the second subset of BWPs includes only the third BWP and the fourth BWP.

Some examples of the method, apparatuses, and non-transitory computer-readable medium described herein may further include operations, features, means, or instructions for receiving third control signaling indicating another selected BWP from the set of BWPs for a second set of slots.

Some examples of the method, apparatuses, and non-transitory computer-readable medium described herein may further include operations, features, means, or instructions for receiving second control signaling updating RBs included in the first set of RBs, RBs included in the second set of RBs, RBs included in the third set of RBs, or a combination thereof.

In some examples of the method, apparatuses, and non-transitory computer-readable medium described herein, receiving the control signaling may include operations, features, means, or instructions for receiving an indication of a first BWP configuration including the first BWP and the second BWP and a second BWP configuration for a half-duplex mode including a third BWP associated with the first communication direction and a fourth BWP associated with the second communication direction, where the control signaling further includes an indication of a time domain switching pattern between the first BWP configuration and the second BWP configuration.

In some examples of the method, apparatuses, and non-transitory computer-readable medium described herein, the time domain switching pattern includes a time gap between one or more slots associated with the first BWP configuration and one or more slots associated with the second BWP configuration.

In some examples of the method, apparatuses, and non-transitory computer-readable medium described herein, a first guard band may be positioned between the first set of RBs and the third set of RBs in the frequency domain and a second guard band may be positioned between the third set of RBs and the second set of RBs in the frequency domain.

A method for wireless communications at a network entity is described. The method may include outputting control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain and communicate in a SBFD mode in the first communication direction via the first BWP and in the second communication direction via the second BWP.

An apparatus for wireless communications at a network entity is described. The apparatus may include a processor, memory coupled with the processor, and instructions stored in the memory. The instructions may be executable by the processor to cause the apparatus to output control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain and communicate in a SBFD mode in the first communication direction via the first BWP and in the second communication direction via the second BWP.

Another apparatus for wireless communications at a network entity is described. The apparatus may include means for outputting control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain and means for communicate in a SBFD mode in the first communication direction via the first BWP and in the second communication direction via the second BWP.

A non-transitory computer-readable medium storing code for wireless communications at a network entity is described. The code may include instructions executable by a processor to output control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain and communicate in a SBFD mode in the first communication direction via the first BWP and in the second communication direction via the second BWP.

In some examples of the method, apparatuses, and non-transitory computer-readable medium described herein, outputting the control signaling may include operations, features, means, or instructions for outputting an indication of a first identifier associated with the first BWP, outputting an indication that the first BWP may be associated with the first communication direction, and outputting, for the first BWP, an indication of the first set of RBs and the second set of RBs from a set of multiple RBs associated with at least one carrier bandwidth that includes the first BWP.

In some examples of the method, apparatuses, and non-transitory computer-readable medium described herein, outputting the control signaling may include operations, features, means, or instructions for outputting an indication of a second identifier associated with the second BWP, outputting an indication that the second BWP may be associated with the second communication direction, and outputting, for the second BWP, an indication of the third set of RBs from the set of multiple RBs.

In some examples of the method, apparatuses, and non-transitory computer-readable medium described herein, the first identifier may be equal to the second identifier.

In some examples of the method, apparatuses, and non-transitory computer-readable medium described herein, the first identifier may be different from the second identifier.

In some examples of the method, apparatuses, and non-transitory computer-readable medium described herein, outputting the control signaling may include operations, features, means, or instructions for outputting an indication of a first identifier associated with the first BWP, outputting an indication that the first BWP may be associated with the first communication direction, outputting, for the first subband, an indication of a beginning RB index of the first set of RBs and a size in RBs of the first set of RBs, and outputting, for the second subband, an indication of a beginning RB index of the second set of RBs and a size in RBs of the second set of RBs.

In some examples of the method, apparatuses, and non-transitory computer-readable medium described herein, outputting the control signaling may include operations, features, means, or instructions for outputting an indication of a second identifier associated with the second BWP, outputting an indication that the second BWP may be associated with the first communication direction, and outputting, for the second BWP, an indication of a beginning RB index of the third set of RBs and a size in RBs of the third set of RBs.

In some examples of the method, apparatuses, and non-transitory computer-readable medium described herein, outputting the control signaling may include operations, features, means, or instructions for outputting an indication of a first identifier associated with the first BWP, outputting an indication that the first BWP may be associated with the first communication direction, and outputting a bitmap for the first BWP indicating the first set of RBs and the second set of RBs.

In some examples of the method, apparatuses, and non-transitory computer-readable medium described herein, outputting the control signaling may include operations, features, means, or instructions for outputting an indication of a second identifier associated with the first BWP, outputting an indication that the second BWP may be associated with the second communication direction, and outputting a second bitmap for the second BWP indicating the third set of RBs.

Some examples of the method, apparatuses, and non-transitory computer-readable medium described herein may further include operations, features, means, or instructions for outputting second control signaling indicating a set of BWPs, the set of BWPs including a first subset of BWPs associated with non-contiguous RBs and a second subset of BWPs associated with contiguous RBs, the first subset of BWPs including the first BWP and the second BWP, and where receiving the control signaling includes receiving an indication that a set of slots may be associated with the first BWP and the second BWP.

Some examples of the method, apparatuses, and non-transitory computer-readable medium described herein may further include operations, features, means, or instructions for outputting third control signaling updating RBs associated with at least one of the first BWP, the second BWP, a third BWP of the second subset of BWPs, or a fourth BWP of the second subset of BWPs, where the third BWP may be associated with the first communication direction and where the fourth BWP may be associated with the second communication direction, where the first subset of BWPs includes only the first BWP and the second BWP, and where the second subset of BWPs includes only the third BWP and the fourth BWP.

Some examples of the method, apparatuses, and non-transitory computer-readable medium described herein may further include operations, features, means, or instructions for outputting third control signaling indicating another selected BWP from the set of BWPs for a second set of slots.

Some examples of the method, apparatuses, and non-transitory computer-readable medium described herein may further include operations, features, means, or instructions for outputting second control signaling updating RBs included in the first set of RBs, RBs included in the second set of RBs, RBs included in the third set of RBs, or a combination thereof.

In some examples of the method, apparatuses, and non-transitory computer-readable medium described herein, outputting the control signaling may include operations, features, means, or instructions for outputting an indication of a first BWP configuration including the first BWP and the second BWP and a second BWP configuration for a half-duplex mode including a third BWP associated with the first communication direction and a fourth BWP associated with the second communication direction, where the control signaling further includes an indication of a time domain switching pattern between the first BWP configuration and the second BWP configuration.

In some examples of the method, apparatuses, and non-transitory computer-readable medium described herein, the time domain switching pattern includes a time gap between one or more slots associated with the first BWP configuration and one or more slots associated with the second BWP configuration.

In some examples of the method, apparatuses, and non-transitory computer-readable medium described herein, a first guard band may be positioned between the first set of RBs and the third set of RBs in the frequency domain and a second guard band may be positioned between the third set of RBs and the second set of RBs in the frequency domain.

DETAILED DESCRIPTION

Figure 1:
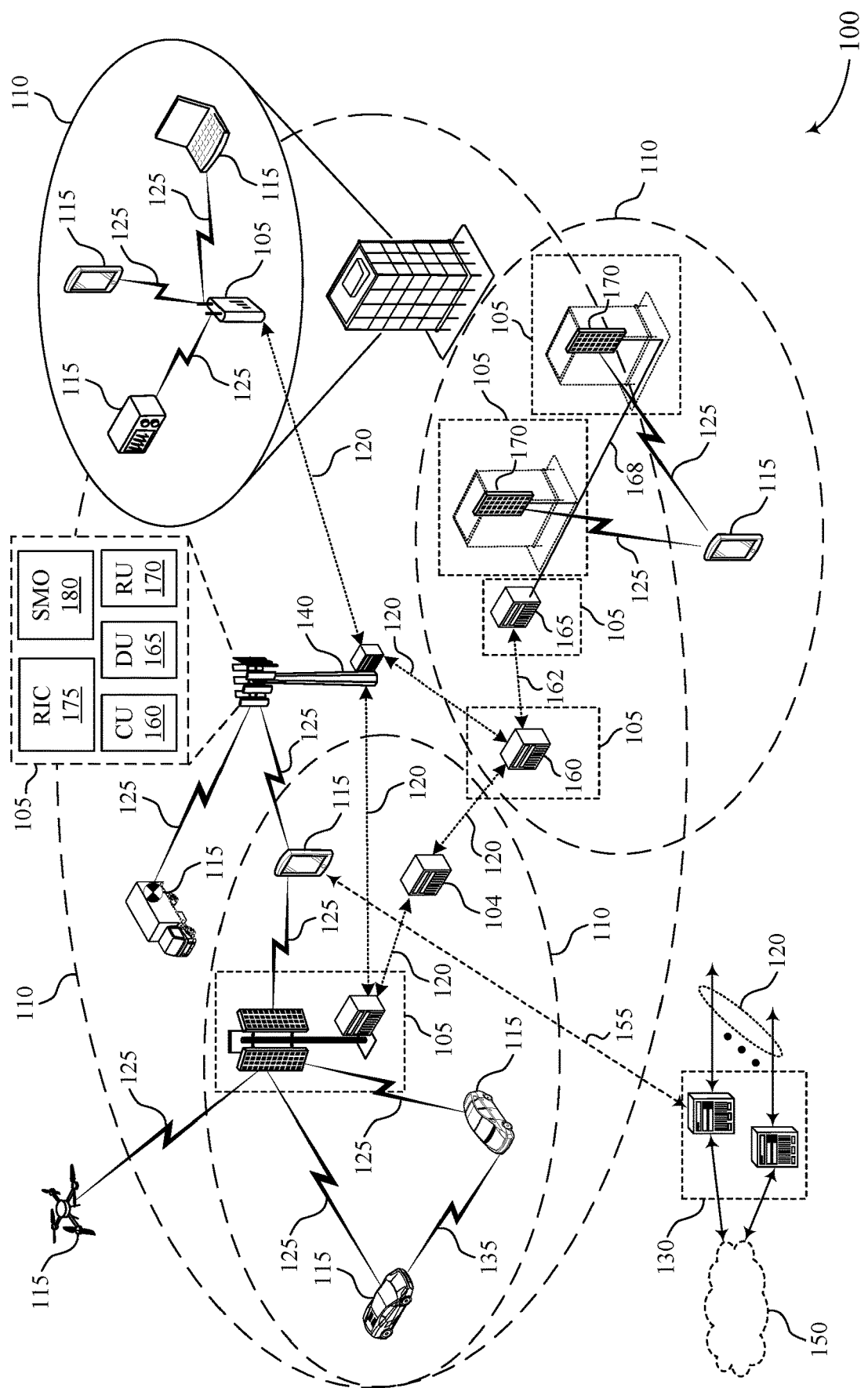
FIG. 1 illustrates an example of a wireless communications system that supports non-contiguous resource blocks (RB)s for bandwidth part (BWP) configuration in accordance with one or more aspects of the present disclosure.

In some wireless communications systems, a wireless device may communicate with one or more other wireless devices in accordance with a half-duplex mode (according to which the wireless device may transmit or receive at non-overlapping times) or a full-duplex mode (according to which the wireless device may transmit and receive simultaneously). Full-duplex communication may provide greater system capacity, higher data rates, and lower latency, than half-duplex communications. Some wireless communications systems may implement a subband full-duplex (SBFD) communication scheme, where a first bandwidth part (BWP) that may include multiple non-contiguous subbands may be used for communications in one direction (one or uplink or downlink), and a second BWP may be used for communications in the other direction in a same time resource (e.g., the same slot or symbol). Subbands may be non-contiguous, meaning that the subbands are separated in the frequency domain. In half-duplex modes, the network may indicate, via radio resource control (RRC) signaling, the resources to use for communications between the network and a user equipment (UE). For example, the network may indicate contiguous sets of resource block (RB)s within an uplink BWP and a downlink BWP. Some wireless communications systems may lack a signaling mechanism according to which the network may inform a UE of the resources to use for full-duplex (e.g., SBFD) communications.

Some wireless communications systems may implement control signaling that configures a UE to communicate in a SBFD mode that includes a non-contiguous BWP and that indicates the RBs that are included in the non-contiguous BWP. In some examples, the non-contiguous BWP may be configured for communications between the UE and the network in one direction (e.g., uplink or downlink), and another BWP may be configured for communications between the UE and the network in the other direction. The non-contiguous BWP may include two subbands, and the other BWP may be non-overlapping with (e.g., positioned between) the two subbands in the frequency domain. In some examples, the control signaling may indicate the RBs in each BWP by including an array for each BWP indicating the RBs included in that BWP (which may be non-contiguous in the frequency domain). In some examples, the control signaling may indicate the RBs in each BWP by including an indication of the subbands in each BWP, the beginning RB index for each subband, and the number of RBs in each subband. In some examples, the control signaling may indicate the RBs in each BWP by including a bitmap for each BWP indicating the RBs included in that BWP. In some examples, additional control signaling, for example a medium access control (MAC) control element (MAC-CE) or a downlink control information (DCI) message, may update the RBs associated with one or more BWP and/or subband. The network may configure a BWP time domain switching pattern. For example, the network may configure communications to switch between SBFD and half-duplex modes according to a BWP time domain switching pattern.

Aspects of the disclosure are initially described in the context of wireless communications systems. Aspects of the disclosure are further illustrated by and described with reference to multiplexing modes, time domain BWP switching pattern, and process flows. Aspects of the disclosure are further illustrated by and described with reference to apparatus diagrams, system diagrams, and flowcharts that relate to non-contiguous RBs for BWP configuration.

FIG. 1 illustrates an example of a wireless communications system 100 that supports non-contiguous RBs for BWP configuration in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to mobile termination (MT) of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support non-contiguous RBs for BWP configuration as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or RBs) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Various devices within the wireless communications system 100 may support one or more levels of duplex operation, which may depend on or be associated with a deployment scenario, a duplex mode (such as TDD only, FDD only, or both TDD and FDD), or an interference management procedure. In some aspects, a wireless device (such as a UE 115, a network entity 105, or an IAB node 104) within the wireless communications system 100 may support half-duplex or full-duplex operation. For example, a network entity 105 may support various types of MIMO communication, including downlink multi-user MIMO (MU-MIMO) according to which the network entity 105 may transmit downlink signaling to two different UEs 115 simultaneously, uplink MU-MIMO according to which the network entity may receive uplink signaling from two different UEs 115 simultaneously, or downlink and uplink MU-MIMO (which may be referred to herein as full-duplex operation) according to which the network entity 105 may transmit downlink signaling to a first UE 115 while simultaneously receiving uplink signaling from a second UE 115. A network entity 105 may further support enhanced MIMO (eMIMO) or further enhanced MIMO (FeMIMO), which may be associated with an FeMIMO beam management session. In accordance with full-duplex operation, a wireless device may be capable of transmitting and receiving simultaneously. In other words, the wireless device may support simultaneous uplink and downlink transmissions (such as an uplink transmission and a downlink transmission that at least partially overlap in time).

Full-duplex operation may include subband full-duplex (SBFD) according to which simultaneous transmission or reception of downlink or uplink signaling may be on a per subband basis or in-band full-duplex (IBFD). In accordance with SBFD, a component carrier bandwidth may be separated, in the frequency domain, to a set of one or more downlink portions and a set of one or more uplink portions for a given time duration (such as for a given slot). For example, within a slot, downlink communication may occur via a first set of one or more frequency bands and uplink communication may occur via a second set of one or more frequency bands. Further, full-duplex operation may include simultaneous transmission and reception on a same symbol, TTI, or slot.

In accordance with half-duplex operation, a wireless device may transmit or receive, but may not transmit and receive simultaneously. A wireless device may support full-duplex operation across various RF bands. For example, a wireless device may support simultaneous uplink and downlink transmissions within a frequency range 1 (FR1) band, within an FR2 band, or across FR1 and FR2 bands. In scenarios in which a wireless device supports simultaneous uplink and downlink transmissions within an FR2 band, the wireless device may further support associated aspects of procedures to enable or facilitate suitable FR2 communication.

Full-duplex capability may be present at either or both of a network entity 105 or a UE 115. In scenarios in which a UE 115 is capable of full-duplex operation, the UE 115 may use a first antenna panel, module, or set of elements for uplink transmission (such as transmitting to a network entity 105) and may use a second antenna panel, module, or set of elements for downlink reception (such as receiving from a network entity 105). In scenarios in which a network entity 105 is capable of full-duplex operation, the network entity 105 may use a first antenna panel, module, or set of elements for uplink reception (such as receiving from a UE 115) and may use a second antenna panel, module, or set of elements for downlink transmission (such as transmitting to a UE 115). In some aspects, a full-duplex capability may be conditional on one or more transmission parameters. For example, a full-duplex capability may be conditional on a beam separation (such as a separation between a first directional beam used for uplink and a second directional beam used for downlink), which may relate or contribute to self-interference between downlink and uplink signaling and clutter (such as clutter echoes, which may refer to interference-causing scattered signals). As such, a wireless device may use full-duplex operation if a first directional beam used for uplink transmission or reception is sufficiently separated from a second directional beam used for downlink transmission or reception in a spatial domain. In some aspects, an amount of self-interference may be associated with or correlate to a distance d between a transmit antenna panel and a receive antenna panel.

In some implementations, a UE 115 and a network entity 105 may support one or more signaling-based mechanisms according to which the network entity 105 may inform the UE 115 of which time and frequency resources may be used for full-duplex communication. For example, a network entity 105 may transmit control signaling (e.g., RRC signaling) that configures a UE 115 to communicate with the network entity 105 in a SBFD mode that includes a non-contiguous BWP and that indicates the RBs that are included in the non-contiguous BWP. In some examples, the non-contiguous BWP may be configured for communications between the UE 115 and the network entity 105 in one direction (e.g., uplink or downlink), and another BWP may be configured for communications between the UE 115 and the network entity 105 in the other direction. The non-contiguous BWP may include two subbands, and the other BWP may be non-overlapping with (e.g., positioned between) the two subbands in the frequency domain. In some examples, the control signaling may indicate the RBs in each BWP by including an array for each BWP indicating the RBs included in that BWP (which may be non-contiguous in the frequency domain). In some examples, the control signaling may indicate the RBs in each BWP by including an indication of the subbands in each BWP, the beginning RB index for each subband, and the number of RBs in each subband. In some examples, the control signaling may indicate the RBs in each BWP by including a bitmap for each BWP indicating the RBs included in that BWP. In some examples, additional control signaling, for example a MAC-CE or a DCI message, may update the RBs associated with one or more BWP and/or subband. The network entity 105 may configure a BWP time domain switching pattern. For example, the network entity 105 may configure communications to switch between SBFD and half-duplex modes according to a BWP time domain switching pattern.

In some examples, a half-duplex UE 115 may be informed of the time and/or frequency resources for subbands that the network entity 105 would use for SBFD operation. Ins some examples, the network entity 105 may inform the UE 115 of the time and/or frequency resources for subbands that the network entity 105 would use for SBFD operation via BWP signaling (e.g., non-contiguous downlink BWP and uplink BWP switching). In some examples, the network entity 105 may inform the UE 115 of the time and/or frequency resources for subbands that the network entity 105 would use for SBFD operation via a semi-static switching time pattern between SBFD and half-duplex symbols or slots via a MAC-CE or RRC.

Figure 2:
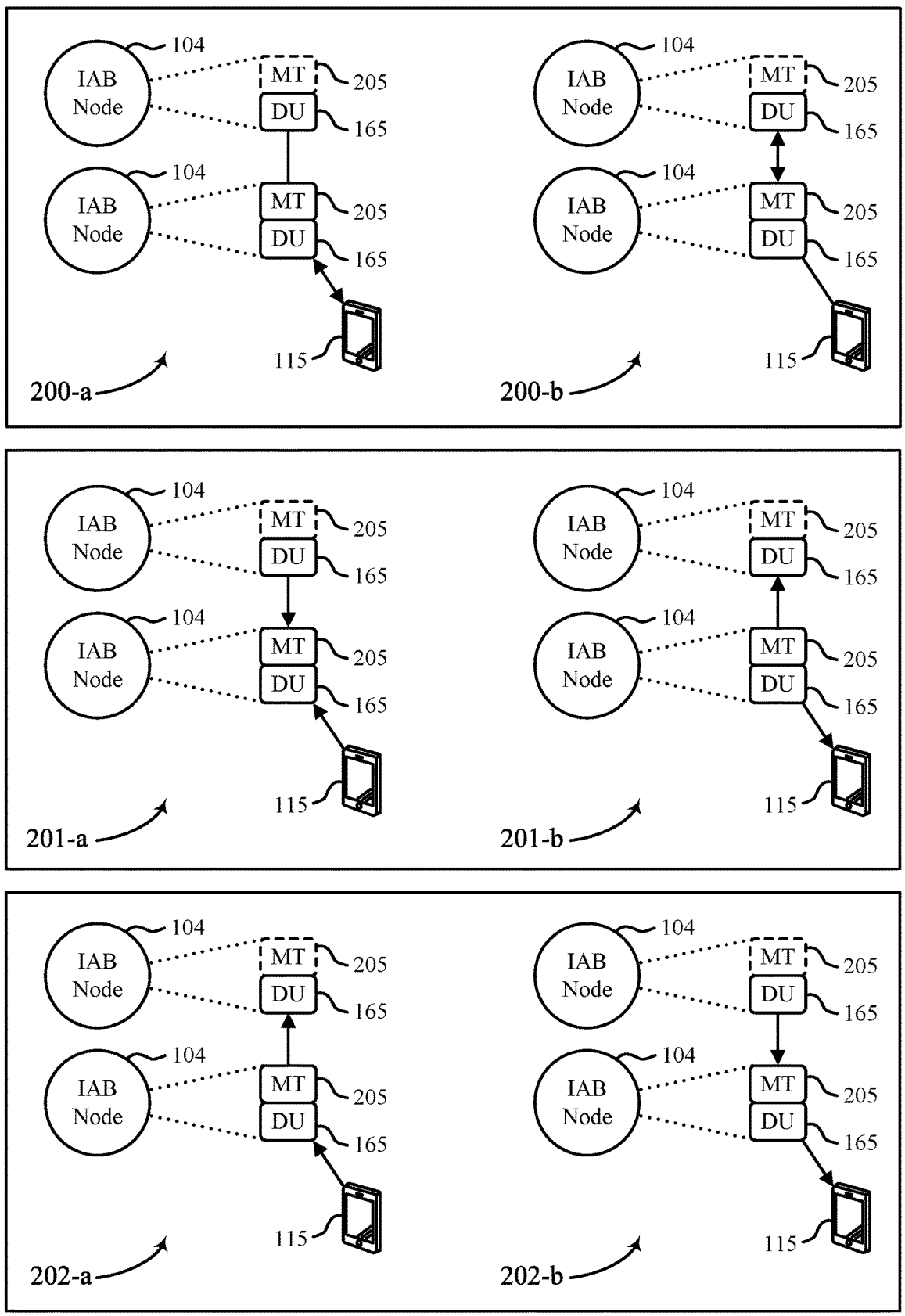
FIG. 2 illustrates an example of multiplexing modes that supports non-contiguous RBs for BWP configuration in accordance with one or more aspects of the present disclosure.

FIG. 2 illustrates an example of multiplexing modes 200, 201, and 202 that support non-contiguous RBs for BWP configuration in accordance with one or more aspects of the present disclosure. The multiplexing modes 200, 201, and 202 may be implemented to realize or facilitate aspects of the wireless communications system 100. For example, the multiplexing modes 200, 201, and 202 illustrate communication between IAB nodes 104, MT devices 205, DUs 165, and UEs 115, which may be examples of corresponding devices as illustrated by and described with reference to FIG. 1. In some implementations, the multiplexing modes 200, 201, and 202 may support one or more signaling-based mechanisms according to which a first device (such as an IAB node 104 or another network entity 105) may inform a UE 115 of which time and frequency resources may be used for full-duplex communication.

In some systems, a network entity 105 or one or more TRPs, or any combination thereof, may communicate with (e.g., transmit to, receive from, output for transmission to, obtain from, or any combination thereof) a UE 115 in accordance with a "baseline" non-full-duplex operation. In such systems, flexible TDD may be disabled at both the network entity 105 and the UE 115. Alternatively, a network entity 105 or one or more TRPs, or any combination thereof, may communicate with (e.g., transmit to, receive from, output for transmission to, obtain from, or any combination thereof) a UE 115 in accordance with any one or more of various types of full-duplex. Such types of full-duplex may involve full-duplex operation at the UE 115 or at the network entity 105 (optionally via one or more TRPs), or at both.

In a first example type of full-duplex, a UE 115 may communicate with a first TRP (such as a TRP 1) via downlink (such that the TRP 1 transmits signaling to the UE 115) and the UE 115 may communicate with a second TRP (such as a TRP 2) via uplink (such that the UE 115 transmits signaling to the TRP 2). In such a first example type of full-duplex (which may be associated with an mTRP deployment), flexible TDD may be disabled at a network entity 105 and flexible TDD may be enabled at the UE 115. In a second example type of full-duplex, a network entity 105 may communicate with a first UE 115 via downlink and may communicate with a second UE 115 via uplink. In such a second example type of full-duplex (which may be associated with an IAB deployment), flexible TDD may be enabled at the network entity 105 and flexible TDD may be disabled at the first and second UEs 115. In a third example type of full-duplex, a network entity 105 may communicate with a UE 115 via both downlink and uplink. In such a third example type of full-duplex, flexible TDD may be enabled at both the network entity 105 and the UE 115.

Further, one or more network entities 105 or one or more TRPs, or any combination thereof, may communicate with (e.g., transmit to, receive from, output for transmission to, obtain from, or any combination thereof) one or more UEs 115 in accordance with one or more of various deployment scenarios that leverage a type of full-duplex. In a first deployment scenario, a full-duplex network entity 105 (e.g., a base station 140 as illustrated by and described with reference to FIG. 1) may communicate with multiple half-duplex UEs 115. For example, a first network entity 105 may transmit downlink signaling to a first UE 115 and may simultaneously receive uplink signaling from a second UE 115. A second network entity 105 may transmit downlink signaling to a third UE 115 and may simultaneously receive uplink signaling from a fourth UE 115. In such deployment scenarios, cross-link interference (CLI) may occur between the various communicating devices (where uplink signaling may interference with downlink signaling) and each of the two full-duplex network entities 105 may experience some amount of self-interference.

In a second deployment scenario, a full-duplex network entity 105 may communicate with a full-duplex UE 115 (such as a full-duplex customer premises equipment (CPE)). For example, the full-duplex network entity 105 may transmit downlink signaling to the full-duplex UE 115 and simultaneously receive uplink signaling from the full-duplex UE 115. In some aspects, the full-duplex network entity 105 also may transmit downlink signaling to another UE 115 (such as a half-duplex UE 115) and, in such aspects, CLI may occur between the two UEs 115. Further, the full-duplex network entity 105 may experience CLI from another network entity 105 and both of the full-duplex network entity 105 and the full-duplex UE 115 may experience self-interference.

In a third deployment scenario, a half-duplex network entity 105 or TRP (such as in an mTRP deployment) may communicate with a full-duplex UE 115 (such as a full-duplex CPE). For example, a first network entity 105 or TRP may transmit downlink signaling to the full-duplex UE 115 and the full-duplex UE 115 may simultaneously transmit uplink signaling to a second network entity 105 or TRP. In some aspects, the first network entity 105 or TRP also may transmit downlink signaling to another UE 115 (such as a half-duplex UE 115) and, in such aspects, CLI may occur between the two UEs 115. Further, the two network entities 105 or TRPs may experience CLI and the full-duplex UE 115 may experience self-interference.

In a fourth deployment scenario, a full-duplex IAB node may communicate with various UEs 115 (such as half-duplex UEs 115). For example, an IAB node 104 (such as an IAB donor or an IAB parent node) may control or operate multiple other IAB nodes 104 and one or more of the multiple IAB nodes 104 may support full-duplex operation. For example, the parent node may control or operate a first IAB node 104 that is capable of transmitting downlink signaling to a first UE 115 and simultaneously receiving uplink signaling from a second UE 115 and may control or operate a second IAB node 104 that is capable of transmitting downlink signaling to a third UE 115 and simultaneously receiving uplink signaling from a fourth UE 115. In such deployments, the first and second IAB nodes 104 may experience CLI from each other or self-interference, or both. In some aspects, the IAB nodes 104 may support a conditional duplexing capability. Additionally, or alternatively, the IAB nodes 104 may support single frequency full-duplex and FDM or space division multiplexing (SDM) with a RB group (RBG) granularity.

In some aspects, a network entity 105, one or more TRPs, and a UE 115 may support various evaluation techniques and performance evaluation metrics associated with different deployment scenarios for full-duplex operation (such as for NR duplexing). Further, a network entity 105, one or more TRPs, and a UE 115 may support one or more techniques to support co-existence with other systems in any co-channels or adjacent channels for subband non-overlapping full-duplex operation or for dynamic or flexible TDD, or for both. For example, a network entity 105, one or more TRPs, and a UE 115 may support techniques associated with duplex operation evolution for NR TDD across various spectrums, including in an unpaired spectrum. In such examples, the network entity 105 (via the one or more TRPs) may support full-duplex operation, a UE 115 may support half-duplex operation, and the network entity 105 and the UE 115 may configure or expect no restrictions on which frequency ranges are available for use.

Such techniques may include various full-duplex types or schemes and corresponding metrics to evaluate a performance of such full-duplex types or schemes, inter-network entity 105 and inter-UE 115 CLI mitigation techniques, intra-subband CLI and inter-subband CLI mitigation techniques (such as in the implementation of subband non-overlapping full-duplex), or a metric-based evaluation procedure for an impact of full-duplex operation on half-duplex operation (assuming co-existence in co-channel and adjacent channels). Additionally, or alternatively, such techniques may include a metric-based evaluation procedure for an impact on RF constraints considering adjacent channel co-existence or for an impact on RF constraints considering self-interference, inter-subband CLI and inter-operator CLI at network entities 105, and inter-subband CLI and inter-operator CLI at UEs 115. Further, such techniques may include antenna or RF and algorithm design for interference mitigation, including antenna isolation, transmission interference management suppression in a receive-side part, filtering, and digital interference suppression. Further, such techniques may comply with one or more regulatory or network specifications associated with full-duplex operation in TDD unpaired spectrums.

In some aspects, various devices within a system may support a signaling mechanism to inform a UE 115 of the time or frequency location of subbands that a network entity 105 may use for full-duplex operation, such as for SBFD operation. Further, various devices may support a specific resource allocation in symbols or slots with subbands that a network entity 105 may use for full-duplex operation, such as SBFD operation.

The multiplexing modes 200, 201, and 202 may support various types of resource management and various types of multiplexing. For example, a multiplexing mode 200-a and a multiplexing mode 200-b may illustrate TDM. The multiplexing mode 200-a may illustrate DU transmission and reception and the multiplexing mode 200-b may illustrate MT transmission and reception. In the examples of the multiplexing mode 200-a and the multiplexing mode 200-b, MT downlink or uplink may use a first set of time domain resources and DU downlink or uplink may use a second set of (non-overlapping) time domain resources.

The multiplexing mode 201-a and the multiplexing mode 201-b may illustrate SDM reception and SDM transmission, respectively. For example, the multiplexing mode 201-a illustrates MT reception and DU reception (which may occur using overlapping or non-overlapping time or frequency resources) and the multiplexing mode 201-b illustrates MT transmission and DU transmission (which may occur using overlapping or non-overlapping time or frequency resources). The multiplexing mode 202-a and the multiplexing mode 202-b illustrate example full-duplex scenarios. For example, the multiplexing mode 202-a illustrates MT transmission and DU reception (which may occur using overlapping or non-overlapping time or frequency resources) and the multiplexing mode 202-b illustrates MT reception and DU transmission (which may occur using overlapping or non-overlapping time or frequency resources).

In any SDM or full-duplex scenarios, communication may occur simultaneously or at different times and may occur using different frequency resources, using partially overlapping frequency resources, or using the same frequency resources. For example, various devices or components may communicate MT downlink or uplink and DU downlink or uplink using non-overlapping frequency resources (e.g., in an FDM scheme), using partially overlapping frequency resources, or using fully overlapping frequency resources. Further, various devices or components may use any combination of MT downlink or uplink and DU downlink or uplink across different RB sets or different subbands. Further, various devices or components may support switching across different configurations over time (e.g., slot by slot).

Figure 3:
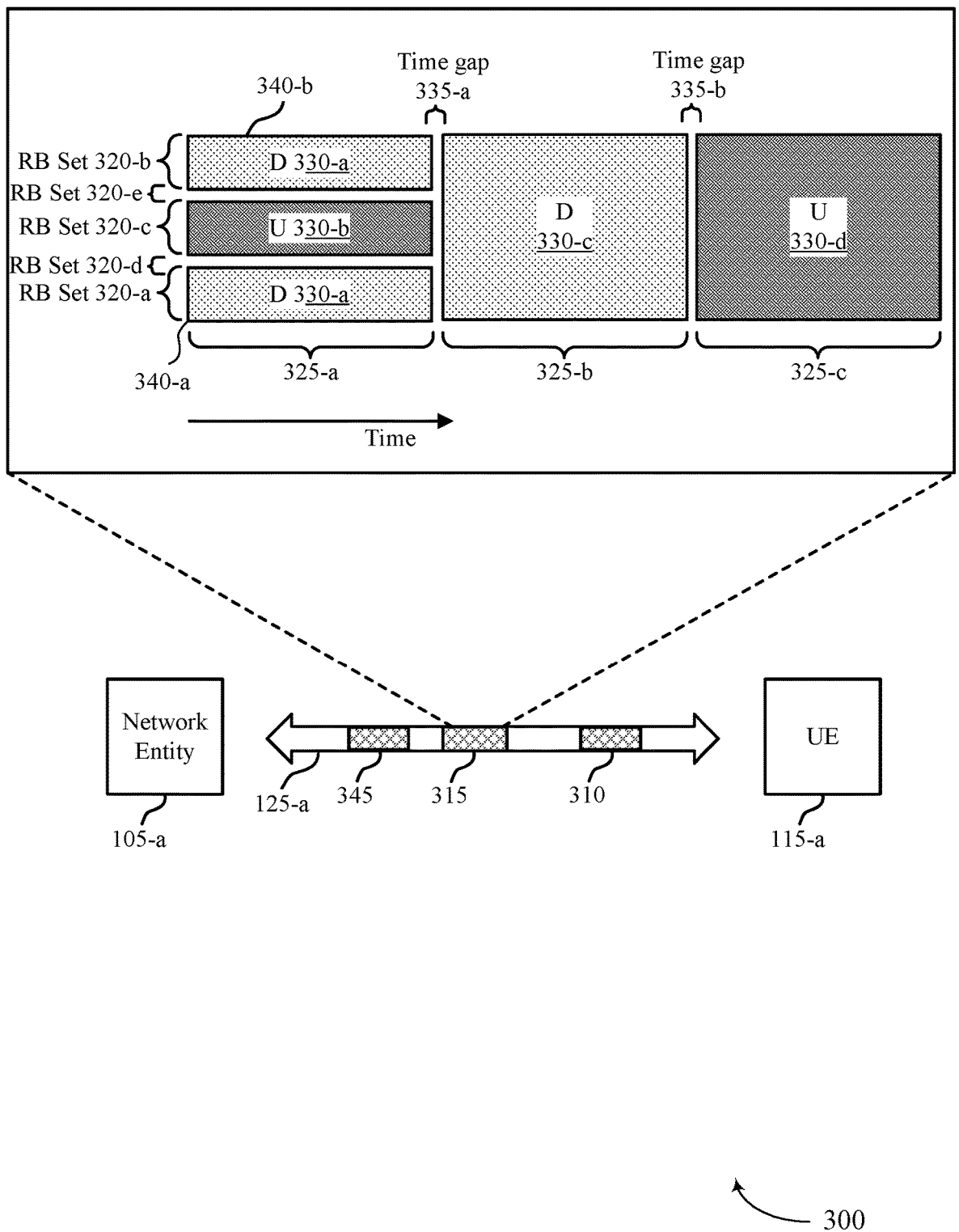
FIG. 3 illustrates an example of a wireless communications system that supports non-contiguous RBs for BWP configuration in accordance with one or more aspects of the present disclosure.

FIG. 3 illustrates an example of a wireless communications system 300 that supports non-contiguous RBs for BWP configuration in accordance with one or more aspects of the present disclosure. The wireless communications system 300 may include a UE 115-a, which may be an example of a UE 115 as described herein. The wireless communications system 300 may include a network entity 105-a, which may be an example of a network entity 105 as described herein.

The UE 115-a may communicate with the network entity 105-a using a communication link 125-a, which may be an example of an NR or LTE link between the UE 115-a and the network entity 105-a. The communication link 125-a may include a bi-directional link that enables both uplink and downlink communication. For example, the UE 115-a may transmit uplink transmissions, such as uplink control signals or uplink data signals, to the network entity 105-a using the communication link 125-a and the network entity 105-a may transmit downlink transmissions, such as downlink control signals or downlink data signals, to the UE 115-a using the communication link 125-a.

The network entity 105-a and the UE 115-a may implement SBFD communications. For example, the UE 115-a may receive, from the network entity 105-a, control signaling 310 including an indication of a first BWP 330-a associated with a first communication direction (e.g., downlink) and a second BWP 330-b associated with a second communication direction (e.g., uplink). The first BWP 330-a includes a first subband 340-a that includes a first set of RBs 320-a and a second subband 340-b that includes a second set of RBs 320-b. The first set of RBs 320-a and the second set of RBs 320-b are non-contiguous in the frequency domain. The second BWP 330-b includes a third set of RBs 320-c. The third set of RBs 320-c is non-overlapping with the first set of RBs 320-a and the second set of RBs 320-c. In some examples, a first guard band may include a fourth set of RBs 320-d between the first set of RBs 320-a and the third set of RBs 320-c, and a second guard band may include a fifth set of RBs 320-e between the second set of RBs 320-b and the third set of RBs 320-c. The control signaling 310-a may indicate that the SBFD mode including the first BWP 330-a and the second BWP 330-b applies to a set of time resources 325-a (e.g., one or more symbols or slots).

The network entity 105-a and the UE 115-a may exchange communications 315 in an SBFD mode via the first BWP 330-a and the second BWP 330-b.

In some examples, the control signaling 310 may be RRC signaling. In some examples, the control signaling 310 may include a BWP information element (IE) that indicates the RBs associated with the downlink BWP (e.g., the first BWP 330-a) and the uplink BWP (e.g., the second BWP 330-b). For example, the control signaling 310 may include an IE for each of the first BWP 330-a and the second BWP 330-b that indicates an array that indicates the RBs included in the respective BWP. For example, a IE locationAndBandwidth may indicate the frequency domain location and bandwidth of a BWP. Another IE may indicate the identifier (ID) for the BWP. The value of the IE locationAndBandwidth may be interpreted as the resource indicator value (MV) that indicates a beginning RB index of a set of candidate RBs (e.g., where the size of the BWP is 275 physical RBs (PRB)s) and a size of the BWP in RBs. Another IE may indicate the subcarrier spacing (SCS) of the BWP. The first PRB may be determined by the RIV, the SCS of the BWP and another IE offsetToCarrier. The control signaling 310 may indicate the communication direction (e.g., uplink or downlink) for each BWP (e.g., the first BWP 330-a and the second BWP 330-b).

A half-duplex configuration may include a third BWP 330-c for downlink that includes the first set of RBs 320-a, the second set of RBs 320-b, the third set of RBs 320-c, the fourth set of RBs 320-d, and the fifth set of RBs 320-e, and a fourth BWP 330-d for uplink that includes the first set of RBs 320-a, the second set of RBs 320-b, the third set of RBs 320-c, the fourth set of RBs 320-d, and the fifth set of RBs 320-e. In a half-duplex configuration, the UE 115-a and the network entity 105-a may switch between the third BWP 330-c and the fourth BWP 330-d. For a half-duplex configuration, a BWP pair (e.g., the third BWP 330-c and the fourth BWP 330-d) have the same BWP ID and the same center frequency.

For a SBFD configuration, a IE locationAndBandwidth-LIST may include an array that indicates multiple values which may be used to determine the RBs in the BWPs. For example, an IE locationAndBandwidth-LIST for the first BWP 330-a may include two values, which may be interpreted as RIVs that indicate the first set of RBs 320-a and the second set of RBs 320-b. An IE locationAndBandwidth-LIST for the second BWP 330-b may include one value, which may be interpreted as an RIV that indicates the third set of RBs 320-c.

In some cases, the first BWP 330-a and the second BWP 330-b may have the same BWP identifier even though the first BWP 330-a and the second BWP 330-b may have different center frequencies. In some cases, the first BWP 330-a and the second BWP 330-b may have different IDs (e.g., an activated SBFD BWP pair may have different IDs).

In some cases, for a non-contiguous BWP, the control signaling 310 may include a first IE locationAndBandwidth that indicates a first set of RBs (e.g., the first set of RBs 320-a) for a first subband of the BWP, and may include additional IE(s) AdditionallocationAndBandwidth for the additional subbands that indicate additional set(s) of RBs for the additional subband(s). For example, the IEs locationAndBandwidth and AdditionallocationAndBandwidth may indicate a respective beginning RB index and a size in RBs of the respective subbands. For example, for the first BWP 330-a, the control signaling 310 may include an IE locationAndBandwidth that indicates the first set of RBs 320-a for the first subband 340-a and an IE AdditionallocationAndBandwidth that indicates the second set of RBs 320-b for the second subband 340-*b*. The control signaling 310 may include an IE locationAndBandwidth for the second BWP 330-*b* that indicates the third set of RBs 320-*c*.

As described herein, in some cases, the first BWP 330-*a* and the second BWP 330-*b* may have the same BWP identifier even though the first BWP 330-*a* and the second BWP 330-*b* may have different center frequencies. In some cases, the first BWP 330-*a* and the second BWP 330-*b* may have different IDs (e.g., an activated SBFD BWP pair may have different IDs).

In some cases, the control signaling 310 may include, for each BWP (e.g., the first BWP 330-*a* and the second BWP 330-*b*), a bitmap indicating the RBs included within the respective BWP. For example, the control signaling 310 may include a bitmap for the first BWP 330-*a* that indicates the first BWP 330-*a* includes the first set of RBs 320-*a* and the second set of RBs 320-*b*. The control signaling 310 may include a bitmap for the second BWP 330-*b* that indicates that the second BWP 330-*b* includes the third set of RBs 320-*c*. The bitmaps may be mapped per RB (e.g., of 275 candidate RBs), or may be mapped per a subset of 275 candidate RBs to save bit overhead. As described herein, in some cases, the first BWP 330-*a* and the second BWP 330-*b* may have the same BWP identifier even though the first BWP 330-*a* and the second BWP 330-*b* may have different center frequencies. In some cases, the first BWP 330-*a* and the second BWP 330-*b* may have different IDs (e.g., an activated SBFD BWP pair may have different IDs).

The fourth set of RBs 320-*d* and the fifth set of RBs 320-*e* may not be assigned to either the first BWP 330-*a* or the second BWP 330-*b* in order to serve as guard bands.

In some cases, the control signaling 310 may indicate multiple (e.g., a quantity N) BWPs including contiguous BWPs and non-contiguous BWPs (e.g., for a SBFD mode).

In some examples, the network entity 105-*a* may configure, via the control signaling 310, one BWP corresponding to one subband configuration. For example, the control signaling 310 may configure only the first BWP 330-*a* and the second BWP 330-*b* for an SBFD mode. The network entity 105-*a* may indicate updates to the BWP configuration via additional control signaling 345 (e.g., via a MAC-CE or a DCI message). For example, the additional control signaling 345 may indicate updated RB allocations for the first BWP 330-*a* and/or the second BWP 330-*b* (e.g., using the same IDs for the first BWP 330-*a* and the second BWP 330-*b*).

As another example, the control signaling 310 may configure multiple BWPs corresponding to multiple subband configurations (e.g., multiple BWP IDs and associated set of RBs). The network entity 105-*a* may switch the active BWPs for the UE 115-*a* via BWP switching signaling (e.g., via indicating IDs for different BWPs).

In some examples, the network entity 105-*a* may update the RBs for the first BWP 330-*a* and/or the second BWP 330-*b* via additional control signaling 345 (e.g., a MAC-CE or DCI message). For example, the additional control signaling 345 may include the same IEs that indicate the BWPs and the RBs included within the BWPs. Accordingly, the additional control signaling 345 may update the RBs for the BWPs by indicating the IDs of the BWP(s) being updated and including updated values for the IE(s) that indicate the RBs for the BWP. In some examples, the additional control signaling 345 may indicate a different BWP ID for the active BWP, and accordingly the UE 115-*a* and the network entity 105-*a* may switch to the BWP corresponding to the newly identifier BWP ID. For example, the additional control signaling 345 indicating the different BWP ID may be a DCI format 1_1, a DCI format 1_2. a DCI format 0_1, or a DCI format 0_2.

In some cases, the control signaling 310 (e.g., RRC signaling or a MAC-CE) may indicate a time domain BWP switching pattern (e.g., a semi-static switching pattern). between SBFD symbols/slots and half-duplex symbols/slots. For example, the control signaling 310 may indicate for the UE 115-*a* to communicate with the network entity 105-*a* in an SBFD mode using the first BWP 330-*a* and the second BWP 330-*b* during a first set of time resources 325-*a*, and for the UE to communicate with the network entity 105-*a* in a half-duplex mode using a third BWP 330-*c* and a fourth BWP 330-*d* in a second set of time resources 325-*b* and a third set of time resources 325-*c*. For example, the UE 115-*a* may receive downlink communications from the network entity 105-*a* via the third BWP 330-*c* during the second set of time resources 325-*b* and the UE 115-*a* may transmit uplink communications to the network entity 105-*a* via the fourth BWP 330-*d* during the third set of time resources 325-*c*. The switching pattern may repeat periodically. The control signaling 310 may indicate gap periods (e.g., time gap 335-*a* and time gap 335-*b*) between the sets of time resources corresponding to BWP switches. For example, the gap periods (e.g., time gap 335-*a* and time gap 335-*b*) may include a number of symbols or slots depending on filter tuning latency of the UE 115-*a*.

In some cases, a time domain BWP switching pattern may link to corresponding BWP IDs. For example, the control signaling 310 may indicate the set of RBs associated with different BWP IDs and then may indicate which BWP IDs are associated with which time resources (e.g., the first set of time resources 325-*a*, the second set of time resources 325-*b*, and the third set of time resources 325-*c*). In some cases, the time domain BWP switching pattern may be indicated via a bitmap or a periodic pattern. In some cases, RRC signaling (e.g., the control signaling 310) may preconfigure multiple time domain switching patterns, and a MAC-CE or a DCI message (e.g., the additional control signaling 345) may select one of the preconfigured time domain BWP switching patterns.

Figure 4:
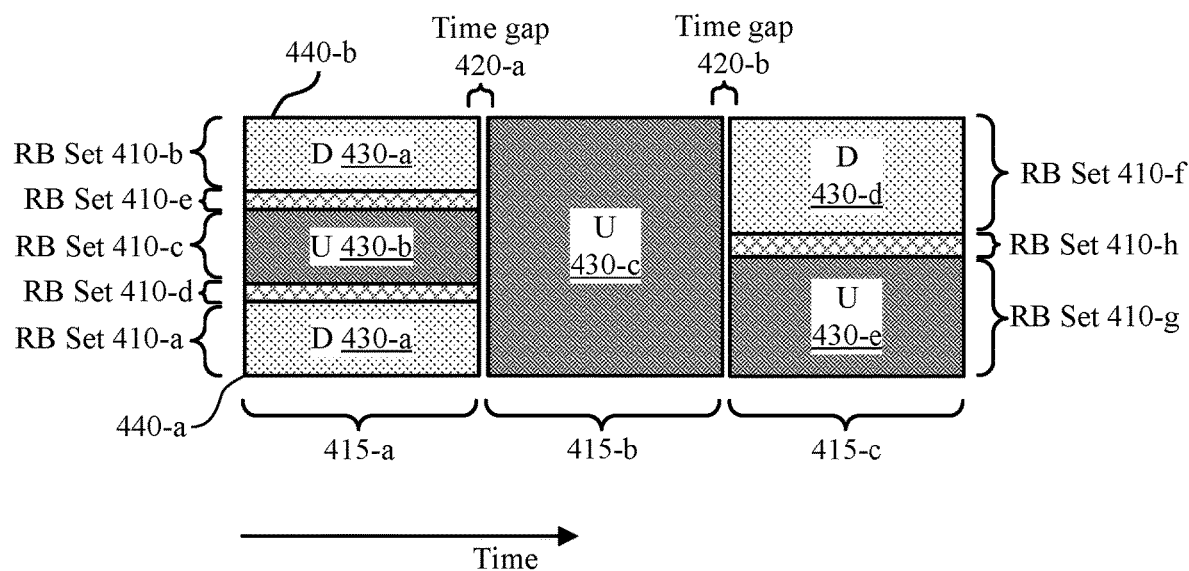
FIG. 4 illustrates an example of a time domain BWP switching pattern that supports non-contiguous RBs for BWP configuration in accordance with one or more aspects of the present disclosure.

FIG. 4 illustrates an example of a time domain BWP switching pattern 400 that supports non-contiguous RBs for BWP configuration in accordance with one or more aspects of the present disclosure. The time domain BWP switching pattern 400 may implement aspects of wireless communications system 100 or the wireless communications system 300.

The time domain BWP switching pattern 400 may be used for communications between a network entity 105 and a UE 115-*a* that may implement SBFD communications. For example, a UE 115 may receive, from a network entity 105, control signaling including an indication of a first BWP 430-*a*, a second BWP 430-*b*, a third BWP 430-*c*, a fourth BWP 430-*d*, and a fifth BWP 430-*e*. The control signaling may indicate that the first BWP 430-*a* is for downlink and includes a first set of RBs 410-*a* and a second set of RBs 410-*b* that are non-contiguous. Accordingly, the first BWP 430-*a* includes a first subband 440-*a* and a second subband 440-*b*. The control signaling may indicate that the second BWP 430-*b* is for uplink and includes a third set of RBs 410-*c*. A fourth set of RBs 410-*d* may form a guard band between the first set of RBs 410-*a* and the third set of RBs 410-*c*, and a fifth set of RBs 410-*e* may form a guard band between the second set of RBs 410-*b* and the third set of RBs 410-*c*. The control signaling may indicate that the second BWP 430-*b* is for uplink and includes the first set of RBs 410-*a*, the second set of RBs 410-*b*, the third set of RBs 410-*c*, the fourth set of RBs 410-*d*, and the fifth set of RBs 410-*e*. The control signaling may indicate that the fourth BWP 430-*d* is for downlink and includes a sixth set of RBs 410-*f*. The control signaling may indicate that the fifth BWP 430-*e* is for uplink and includes a seventh set of RBs 410-*g*. An eighth set of RBs 410-*h* may form a guard band between the sixth set of RBs 410-*f* and the seventh set of RBs 410-*g*.

The control signaling may indicate to use the first BWP 430-*a* and the second BWP 430-*b* for communications between the UE 115 and the network entity 105 during a first set of time resources 415-*a* (e.g., in an SBFD mode). The control signaling may indicate to use the third BWP 430-*c* for communications between the UE 115 and the network entity 105 during a second set of time resources 415-*b* (e.g., a half-duplex mode). The control signaling may indicate to use the fourth BWP 430-*d* and the fifth BWP 430-*e* for communications between the UE 115 and the network entity 105 during a third set of time resources 415-*c* (e.g., in a full-duplex mode). The time domain BWP switching pattern 400 may repeat periodically. The control signaling may indicate gap periods (e.g., time gap 420-*a* and time gap 420-*b*) between the sets of time resources corresponding to BWP switches. For example, the gap periods (e.g., time gap 420-*a* and time gap 420-*b*) may include a number of symbols or slots depending on filter tuning latency of the UE 115.

Figure 5:
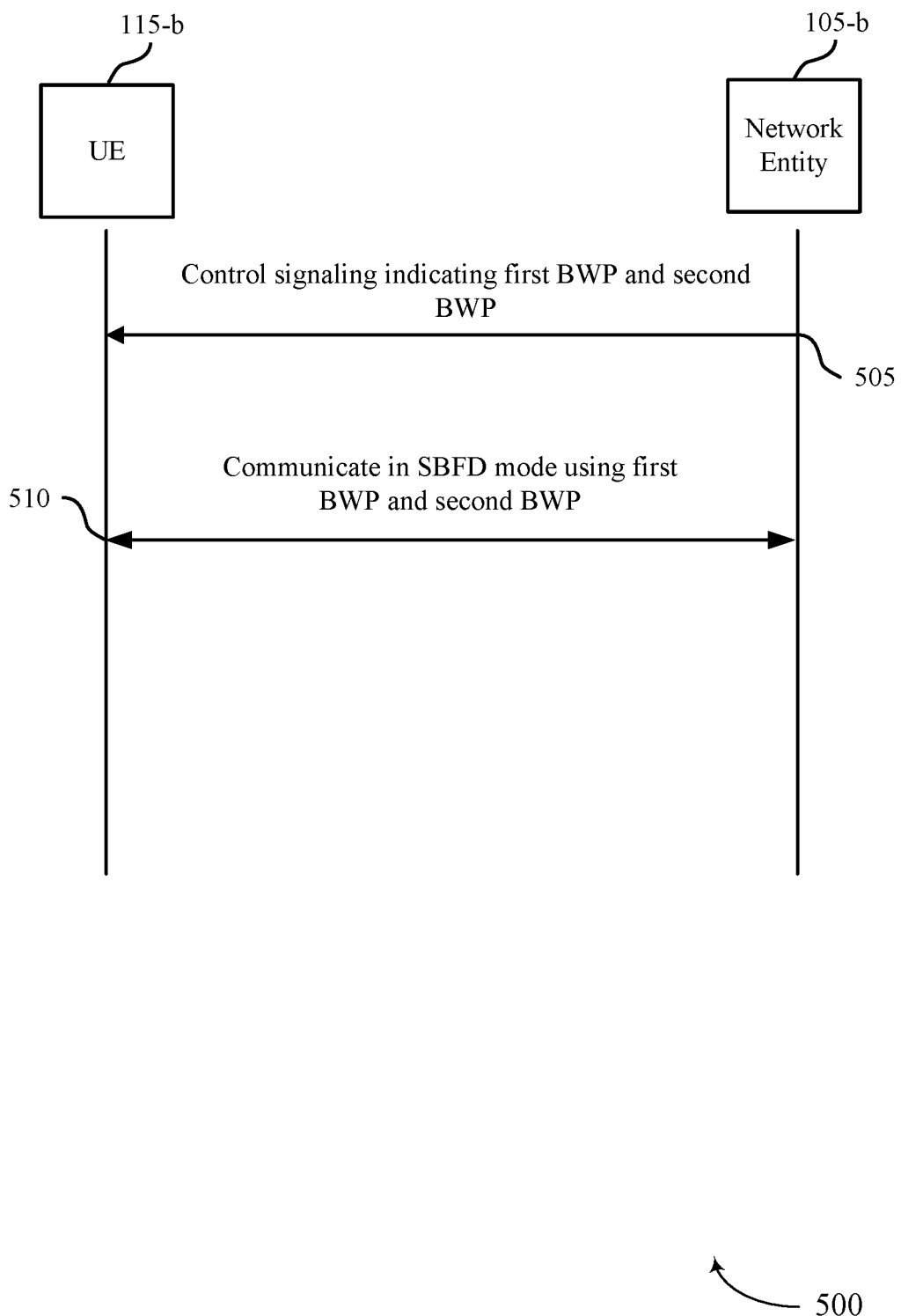
FIG. 5 illustrates an example of a process flow that supports non-contiguous RBs for BWP configuration in accordance with one or more aspects of the present disclosure.

FIG. 5 illustrates an example of a process flow 500 that supports non-contiguous RBs for BWP configuration in accordance with one or more aspects of the present disclosure. The process flow 500 may include a UE 115-*b*, which may be an example of a UE 115 as described herein. The process flow 500 may include a network entity 105-*b*, which may be an example of a network entity 105 as described herein. In the following description of the process flow 500, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 500, and other operations may be added to the process flow 500.

At 505, the UE 115-*b* may receive, from the network entity 105-*b*, control signaling (e.g., RRC signaling) including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain.

At 510, the UE 115-*b* may communicate with the network entity in a SBFD mode in the first communication direction via the first BWP and in the second communication direction via the second BWP.

In some examples, receiving the control signaling includes: receiving an indication of a first identifier associated with the first BWP; receiving an indication that the first BWP is associated with the first communication direction; and receiving, for the first BWP, an indication of the first set of RBs and the second set of RBs from a set of multiple RBs associated with at least one carrier bandwidth that includes the first BWP. In some examples, receiving the control signaling further includes: receiving an indication of a second identifier associated with the second BWP; receiving an indication that the second BWP is associated with the second communication direction; and receiving, for the second BWP, an indication of the third set of RBs from the set of multiple RBs. In some examples, first identifier is equal to the second identifier. In some examples, first identifier is different from the second identifier.

In some examples, receiving the control signaling includes: receiving an indication of a first identifier associated with the first BWP; receiving an indication that the first BWP is associated with the first communication direction; receiving, for the first subband, an indication of a beginning RB index of the first set of RBs and a size in RBs of the first set of RBs; and receiving, for the second subband, an indication of a beginning RB index of the second set of RBs and a size in RBs of the second set of RBs. In some examples, receiving the control signaling further includes: receiving an indication of a second identifier associated with the second BWP; receiving an indication that the second BWP is associated with the first communication direction; and receiving, for the second BWP, an indication of a beginning RB index of the third set of RBs and a size in RBs of the third set of RBs. In some examples, first identifier is equal to the second identifier. In some examples, first identifier is different from the second identifier.

In some examples, receiving the control signaling includes: receiving an indication of a first identifier associated with the first BWP; receiving an indication that the first BWP is associated with the first communication direction; and receiving a bitmap for the first BWP indicating the first set of RBs and the second set of RBs. In some examples, receiving the control signaling further includes: receiving an indication of a second identifier associated with the first BWP; receiving an indication that the second BWP is associated with the second communication direction; and receiving a second bitmap for the second BWP indicating the third set of RBs. In some examples, first identifier is equal to the second identifier. In some examples, first identifier is different from the second identifier.

In some examples, the UE 115-*b* may further receive, from the network entity 105-*b*, second control signaling (e.g., RRC signaling) indicating a set of BWPs, the set of BWPs including a first subset of BWPs associated with non-contiguous RBs and a second subset of BWPs associated with contiguous RBs, the first subset of BWPs including the first BWP and the second BWP, and where receiving the control signaling includes receiving an indication that a set of slots are associated with the first BWP and the second BWP. In some examples, the UE 115-*b* may further receive, from the network entity 105-*b*, third control signaling (e.g., a MAC-CE or DCI message) updating RBs associated with at least one of the first BWP, the second BWP, a third BWP of the second subset of BWPs, or a fourth BWP of the second subset of BWPs, where the third BWP is associated with the first communication direction and where the fourth BWP is associated with the second communication direction, where the first subset of BWPs includes only the first BWP and the second BWP, and where the second subset of BWPs includes only the third BWP and the fourth BWP. In some examples, the UE 115-*b* may further receive, from the network entity 105-*b*, third control signaling (e.g., a DCI message) indicating another selected BWP from the set of BWPs for a second set of slots.

In some examples, the UE 115-*b* may further receive, from the network entity 105-*b*, second control signaling (e.g., a MAC-CE, DCI message, or subsequent RRC signaling) updating RBs included in the first set of RBs, RBs included in the second set of RBs, RBs included in the third set of RBs, or a combination thereof.

In some examples, receiving the control signaling includes receiving an indication of a first BWP configuration including the first BWP and the second BWP and a second BWP configuration for a half-duplex mode including a third BWP associated with the first communication direction and a fourth BWP associated with the second communication direction, where the control signaling further includes an indication of a time domain switching pattern between the first BWP configuration and the second BWP configuration. In some examples, the time domain switching pattern includes a time gap between one or more slots associated with the first BWP configuration and one or more slots associated with the second BWP configuration.

In some examples, a first guard band is positioned between the first set of RBs and the third set of RBs in the frequency domain and a second guard band is positioned between the third set of RBs and the second set of RBs in the frequency domain.

Figure 6:
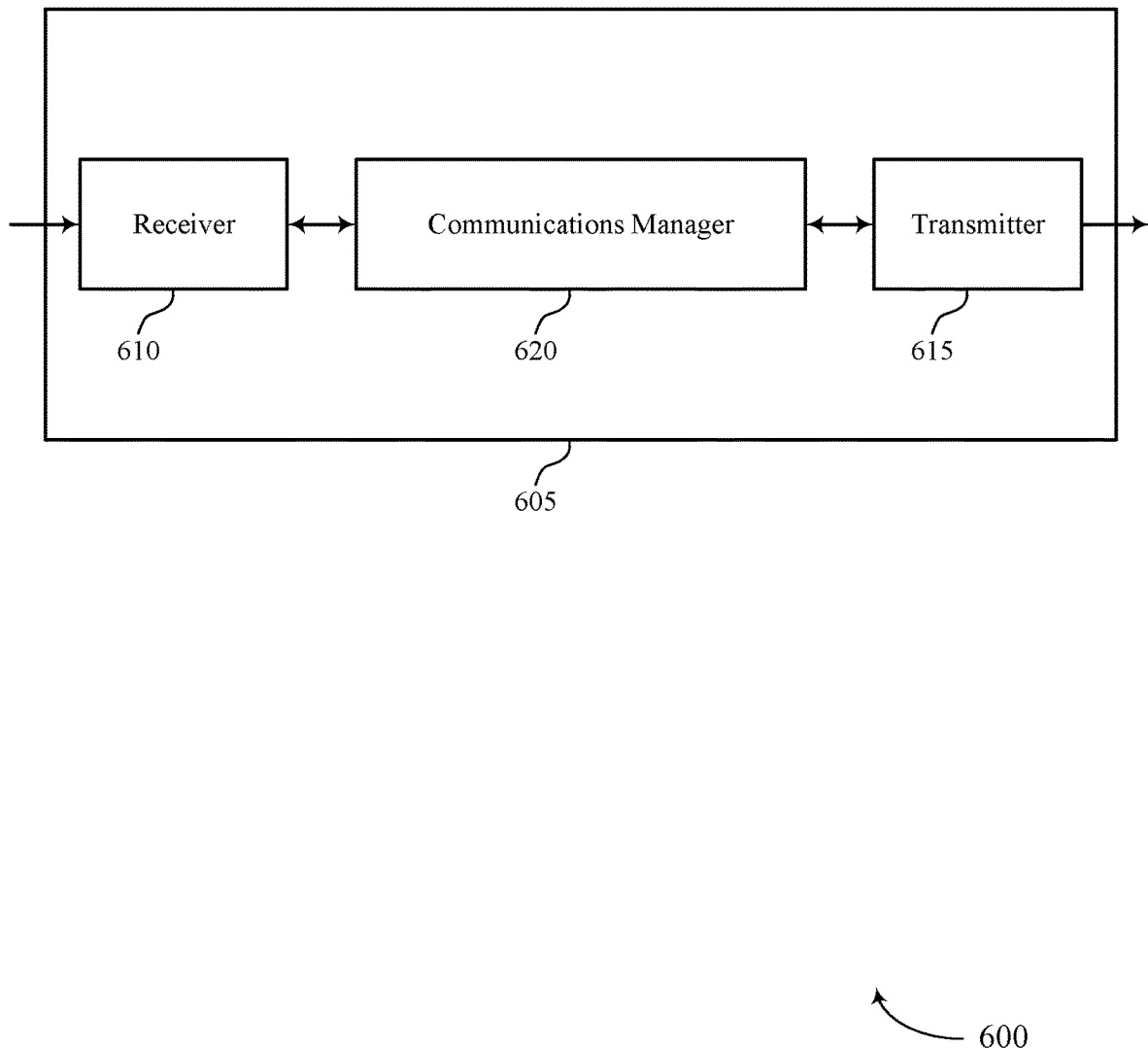
FIGS. 6 and 7 show block diagrams of devices that support non-contiguous RBs for BWP configuration in accordance with one or more aspects of the present disclosure.

FIG. 6 shows a block diagram 600 of a device 605 that supports non-contiguous RBs for BWP configuration in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to non-contiguous RBs for BWP configuration). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to non-contiguous RBs for BWP configuration). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of non-contiguous RBs for BWP configuration as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving, from a network entity, control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain. The communications manager 620 may be configured as or otherwise support a means for communicating with the network entity in a SBFD mode in the first communication direction via the first BWP and in the second communication direction via the second BWP.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources.

Figure 7:
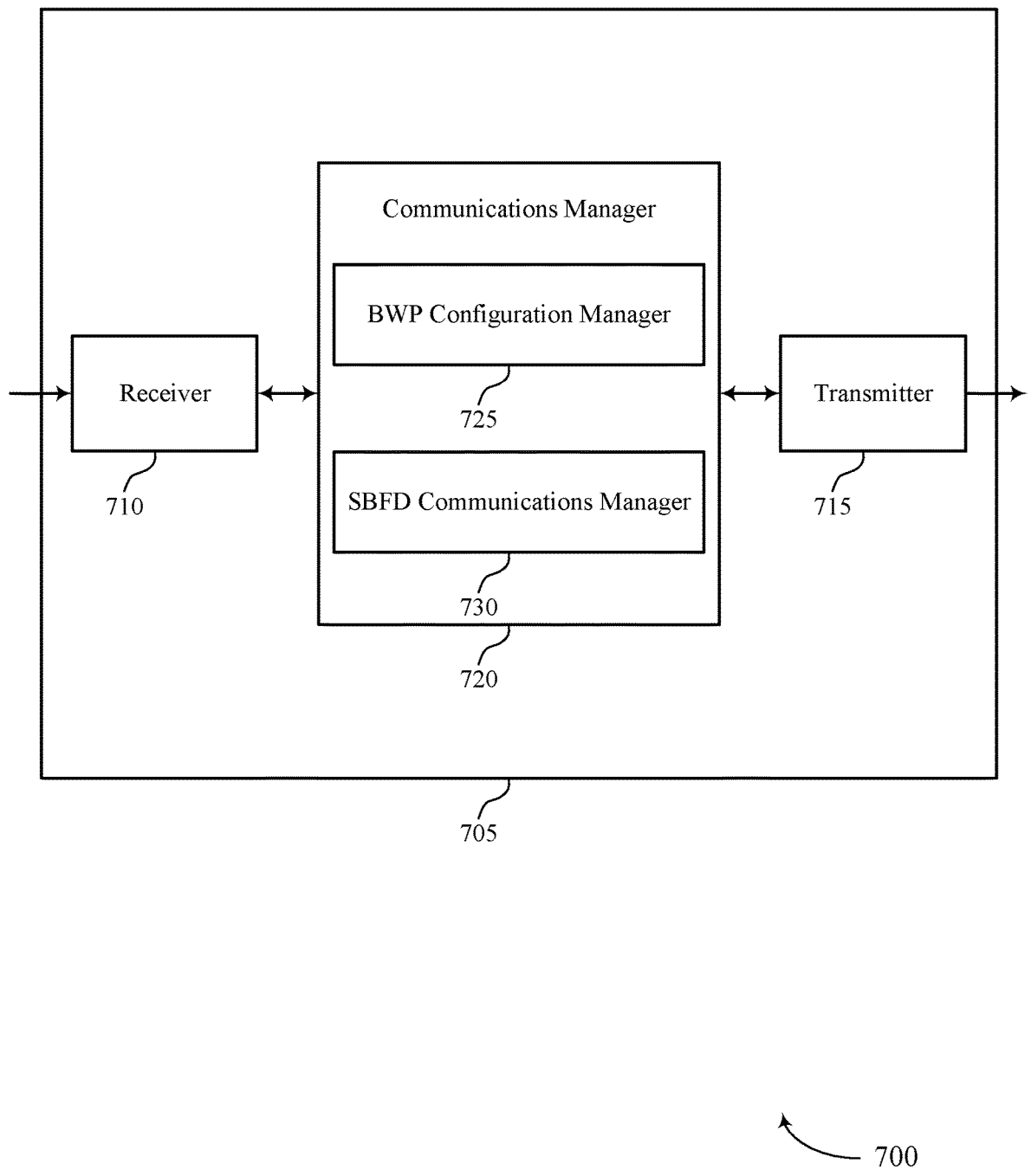

FIG. 7 shows a block diagram 700 of a device 705 that supports non-contiguous RBs for BWP configuration in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to non-contiguous RBs for BWP configuration). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to non-contiguous RBs for BWP configuration). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of non-contiguous RBs for BWP configuration as described herein. For example, the communications manager 720 may include a BWP configuration manager 725 an SBFD communications manager 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The BWP configuration manager 725 may be configured as or otherwise support a means for receiving, from a network entity, control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain. The SBFD communications manager 730 may be configured as or otherwise support a means for communicating with the network entity in a SBFD mode in the first communication direction via the first BWP and in the second communication direction via the second BWP.

Figure 8:
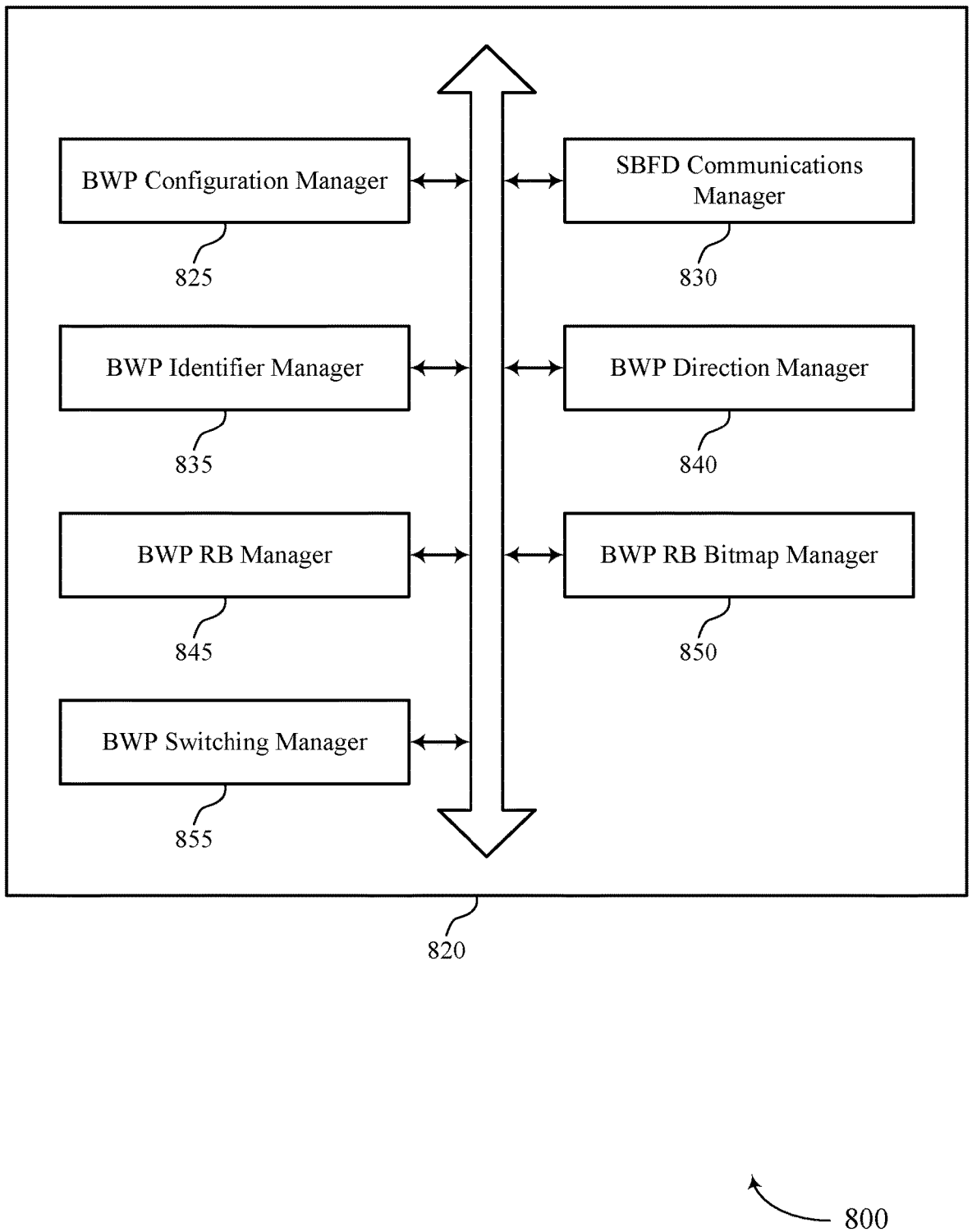
FIG. 8 shows a block diagram of a communications manager that supports non-contiguous RBs for BWP configuration in accordance with one or more aspects of the present disclosure.

FIG. 8 shows a block diagram 800 of a communications manager 820 that supports non-contiguous RBs for BWP configuration in accordance with one or more aspects of the present disclosure. The communications manager 820 may be an example of aspects of a communications manager 620, a communications manager 720, or both, as described herein. The communications manager 820, or various components thereof, may be an example of means for performing various aspects of non-contiguous RBs for BWP configuration as described herein. For example, the communications manager 820 may include a BWP configuration manager 825, an SBFD communications manager 830, a BWP identifier manager 835, a BWP direction manager 840, a BWP RB manager 845, a BWP RB bitmap manager 850, a BWP switching manager 855, or any combination thereof. Each of these components may communicate, directly or indirectly, with one another (e.g., via one or more buses).

The communications manager 820 may support wireless communications at a UE in accordance with examples as disclosed herein. The BWP configuration manager 825 may be configured as or otherwise support a means for receiving, from a network entity, control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain. The SBFD communications manager 830 may be configured as or otherwise support a means for communicating with the network entity in a SBFD mode in the first communication direction via the first BWP and in the second communication direction via the second BWP.

In some examples, to support receiving the control signaling, the BWP identifier manager 835 may be configured as or otherwise support a means for receiving an indication of a first identifier associated with the first BWP. In some examples, to support receiving the control signaling, the BWP direction manager 840 may be configured as or otherwise support a means for receiving an indication that the first BWP is associated with the first communication direction. In some examples, to support receiving the control signaling, the BWP RB manager 845 may be configured as or otherwise support a means for receiving, for the first BWP, an indication of the first set of RBs and the second set of RBs from a set of multiple RBs associated with at least one carrier bandwidth that includes the first BWP.

In some examples, to support receiving the control signaling, the BWP identifier manager 835 may be configured as or otherwise support a means for receiving an indication of a second identifier associated with the second BWP. In some examples, to support receiving the control signaling, the BWP direction manager 840 may be configured as or otherwise support a means for receiving an indication that the second BWP is associated with the second communication direction. In some examples, to support receiving the control signaling, the BWP RB manager 845 may be configured as or otherwise support a means for receiving, for the second BWP, an indication of the third set of RBs from the set of multiple RBs.

In some examples, the first identifier is equal to the second identifier.

In some examples, the first identifier is different from the second identifier.

In some examples, to support receiving the control signaling, the BWP identifier manager 835 may be configured as or otherwise support a means for receiving an indication of a first identifier associated with the first BWP. In some examples, to support receiving the control signaling, the BWP direction manager 840 may be configured as or otherwise support a means for receiving an indication that the first BWP is associated with the first communication direction. In some examples, to support receiving the control signaling, the BWP RB manager 845 may be configured as or otherwise support a means for receiving, for the first subband, an indication of a beginning RB index of the first set of RBs and a size in RBs of the first set of RBs. In some examples, to support receiving the control signaling, the BWP RB manager 845 may be configured as or otherwise support a means for receiving, for the second subband, an indication of a beginning RB index of the second set of RBs and a size in RBs of the second set of RBs.

In some examples, to support receiving the control signaling, the BWP identifier manager 835 may be configured as or otherwise support a means for receiving an indication of a second identifier associated with the second BWP. In some examples, to support receiving the control signaling, the BWP direction manager 840 may be configured as or otherwise support a means for receiving an indication that the second BWP is associated with the first communication direction. In some examples, to support receiving the control signaling, the BWP RB manager 845 may be configured as or otherwise support a means for receiving, for the second BWP, an indication of a beginning RB index of the third set of RBs and a size in RBs of the third set of RBs.

In some examples, to support receiving the control signaling, the BWP identifier manager 835 may be configured as or otherwise support a means for receiving an indication of a first identifier associated with the first BWP. In some examples, to support receiving the control signaling, the BWP direction manager 840 may be configured as or otherwise support a means for receiving an indication that the first BWP is associated with the first communication direction. In some examples, to support receiving the control signaling, the BWP RB bitmap manager 850 may be configured as or otherwise support a means for receiving a bitmap for the first BWP indicating the first set of RBs and the second set of RBs.

In some examples, to support receiving the control signaling, the BWP identifier manager 835 may be configured as or otherwise support a means for receiving an indication of a second identifier associated with the first BWP. In some examples, to support receiving the control signaling, the BWP direction manager 840 may be configured as or otherwise support a means for receiving an indication that the second BWP is associated with the second communication direction. In some examples, to support receiving the control signaling, the BWP RB bitmap manager 850 may be configured as or otherwise support a means for receiving a second bitmap for the second BWP indicating the third set of RBs.

In some examples, the BWP configuration manager 825 may be configured as or otherwise support a means for receiving second control signaling indicating a set of BWPs, the set of BWPs including a first subset of BWPs associated with non-contiguous RBs and a second subset of BWPs associated with contiguous RBs, the first subset of BWPs including the first BWP and the second BWP, and where receiving the control signaling includes receiving an indication that a set of slots are associated with the first BWP and the second BWP.

In some examples, the BWP configuration manager 825 may be configured as or otherwise support a means for receiving third control signaling updating RBs associated with at least one of the first BWP, the second BWP, a third BWP of the second subset of BWPs, or a fourth BWP of the second subset of BWPs, where the third BWP is associated with the first communication direction and where the fourth BWP is associated with the second communication direction, where the first subset of BWPs includes only the first BWP and the second BWP, and where the second subset of BWPs includes only the third BWP and the fourth BWP.

In some examples, the BWP configuration manager 825 may be configured as or otherwise support a means for receiving third control signaling indicating another selected BWP from the set of BWPs for a second set of slots.

In some examples, the BWP RB manager 845 may be configured as or otherwise support a means for receiving second control signaling updating RBs included in the first set of RBs, RBs included in the second set of RBs, RBs included in the third set of RBs, or a combination thereof.

In some examples, to support receiving the control signaling, the BWP switching manager 855 may be configured as or otherwise support a means for receiving an indication of a first BWP configuration including the first BWP and the second BWP and a second BWP configuration for a half-duplex mode including a third BWP associated with the first communication direction and a fourth BWP associated with the second communication direction, where the control signaling further includes an indication of a time domain switching pattern between the first BWP configuration and the second BWP configuration.

In some examples, the time domain switching pattern includes a time gap between one or more slots associated with the first BWP configuration and one or more slots associated with the second BWP configuration.

In some examples, a first guard band is positioned between the first set of RBs and the third set of RBs in the frequency domain. In some examples, a second guard band is positioned between the third set of RBs and the second set of RBs in the frequency domain.

Figure 9:
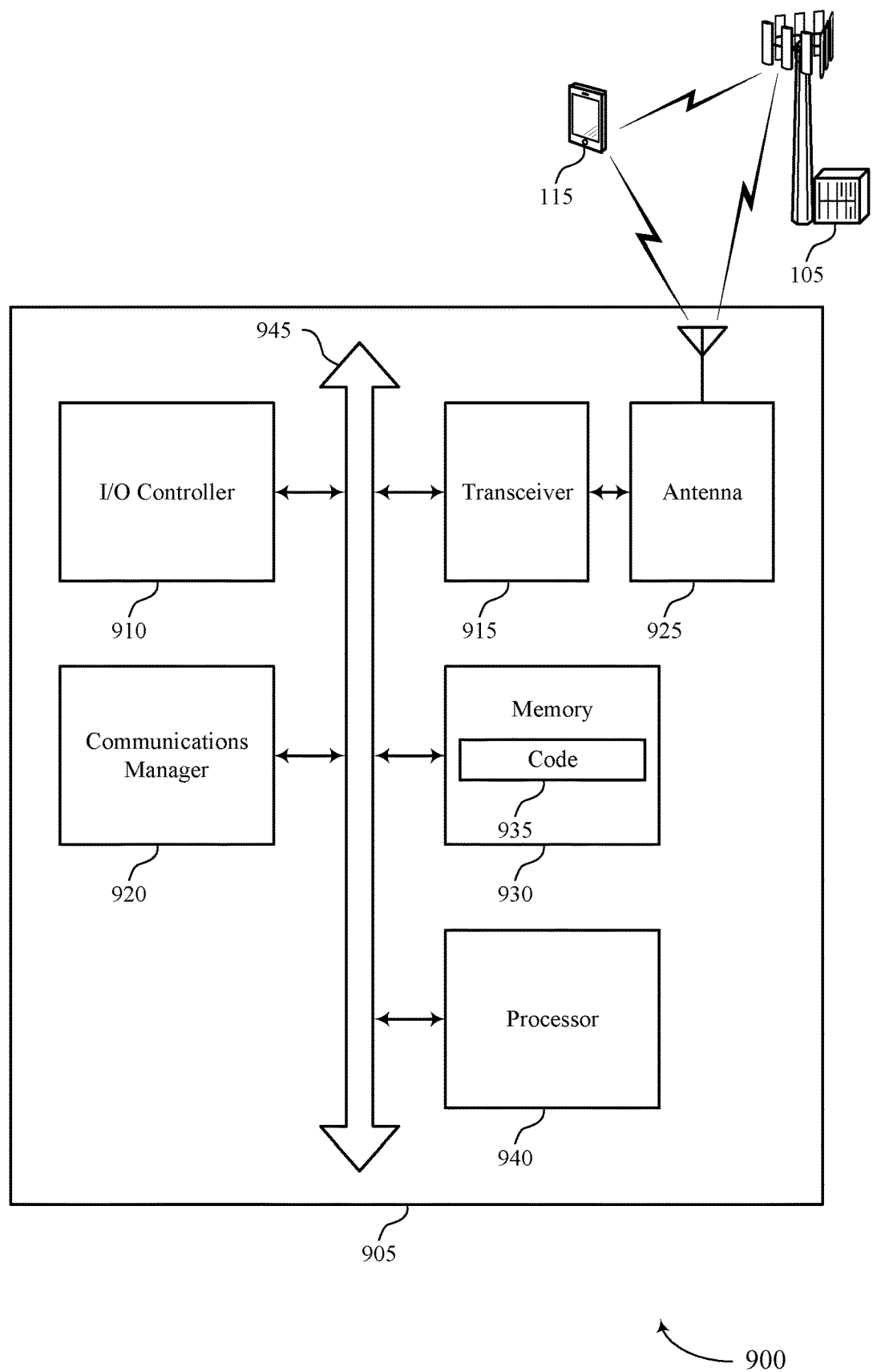
FIG. 9 shows a diagram of a system including a device that supports non-contiguous RBs for BWP configuration in accordance with one or more aspects of the present disclosure.

FIG. 9 shows a diagram of a system 900 including a device 905 that supports non-contiguous RBs for BWP configuration in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting non-contiguous RBs for BWP configuration). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a network entity, control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain. The communications manager 920 may be configured as or otherwise support a means for communicating with the network entity in a SBFD mode in the first communication direction via the first BWP and in the second communication direction via the second BWP.

By including or configuring the communications manager 920 in accordance with examples as described herein, the device 905 may support techniques for more efficient utilization of communication resources and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of non-contiguous RBs for BWP configuration as described herein, or the processor 940 and the memory 930 may be otherwise configured to perform or support such operations.

Figure 10:
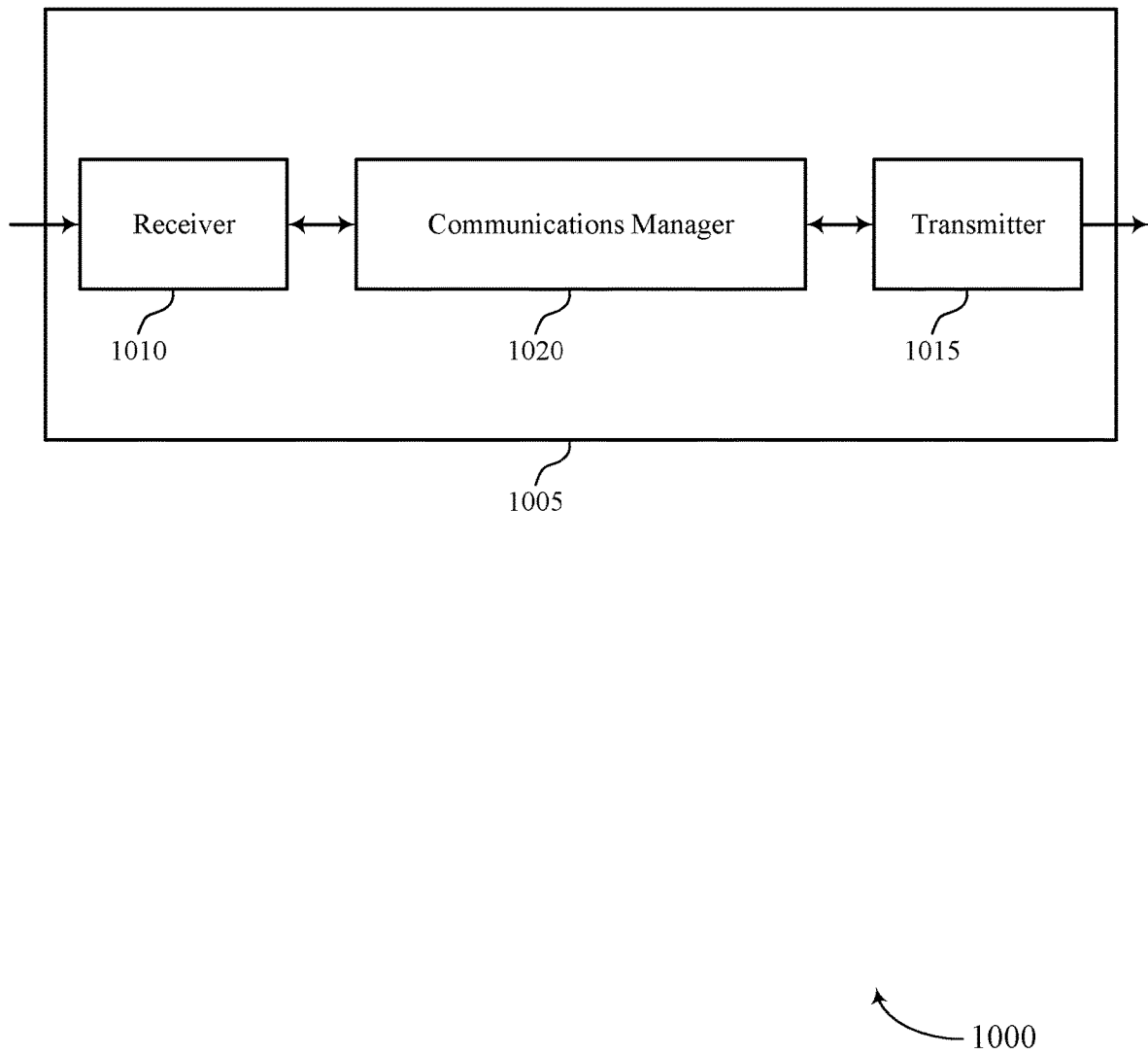
FIGS. 10 and 11 show block diagrams of devices that support non-contiguous RBs for BWP configuration in accordance with one or more aspects of the present disclosure.

FIG. 10 shows a block diagram 1000 of a device 1005 that supports non-contiguous RBs for BWP configuration in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of non-contiguous RBs for BWP configuration as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for outputting control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain. The communications manager 1020 may be configured as or otherwise support a means for communicating in a SBFD mode in the first communication direction via the first BWP and in the second communication direction via the second BWP.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
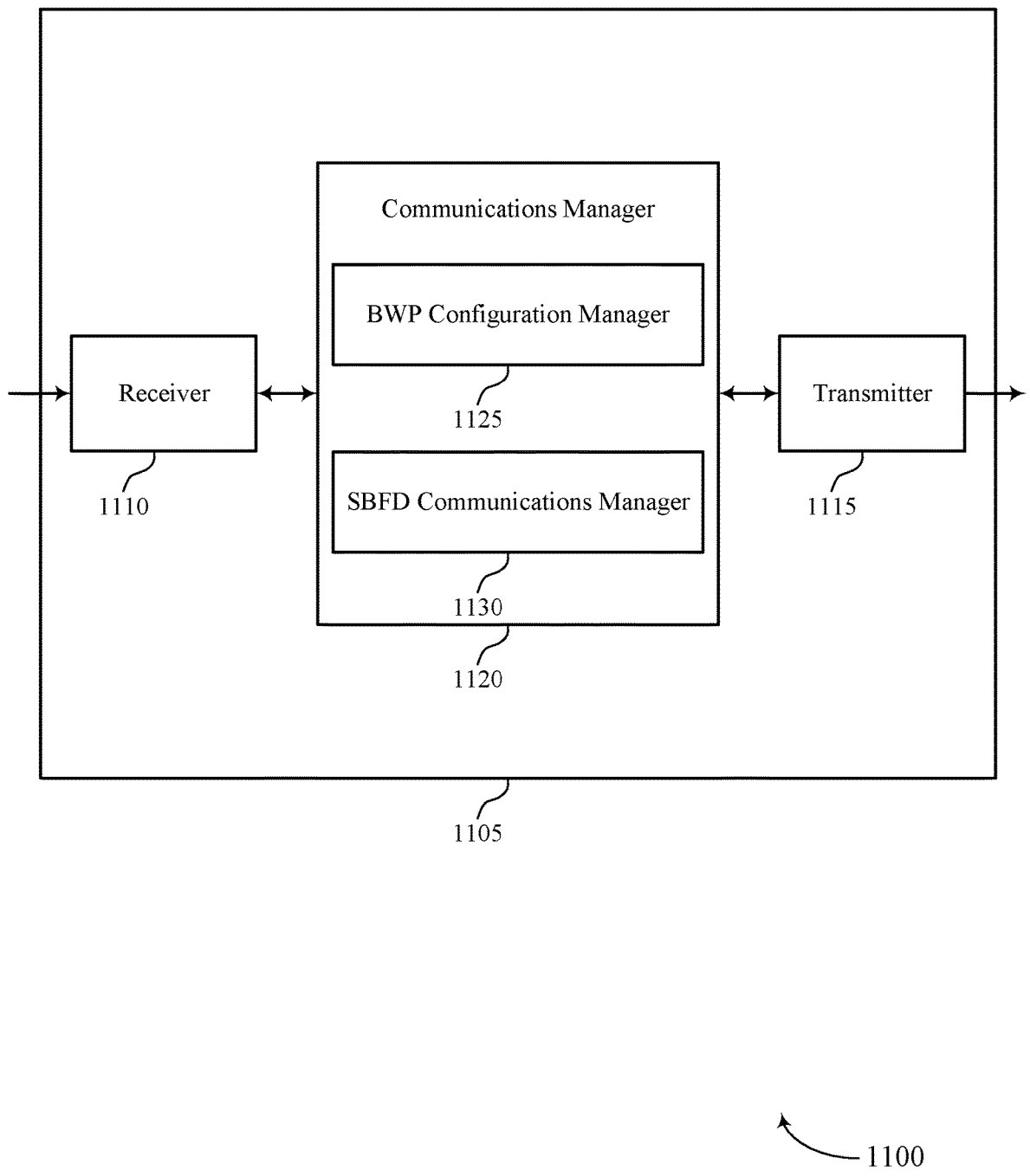

FIG. 11 shows a block diagram 1100 of a device 1105 that supports non-contiguous RBs for BWP configuration in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of non-contiguous RBs for BWP configuration as described herein. For example, the communications manager 1120 may include a BWP configuration manager 1125 an SBFD communications manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The BWP configuration manager 1125 may be configured as or otherwise support a means for outputting control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain. The SBFD communications manager 1130 may be configured as or otherwise support a means for communicate in a SBFD mode in the first communication direction via the first BWP and in the second communication direction via the second BWP.

Figure 12:
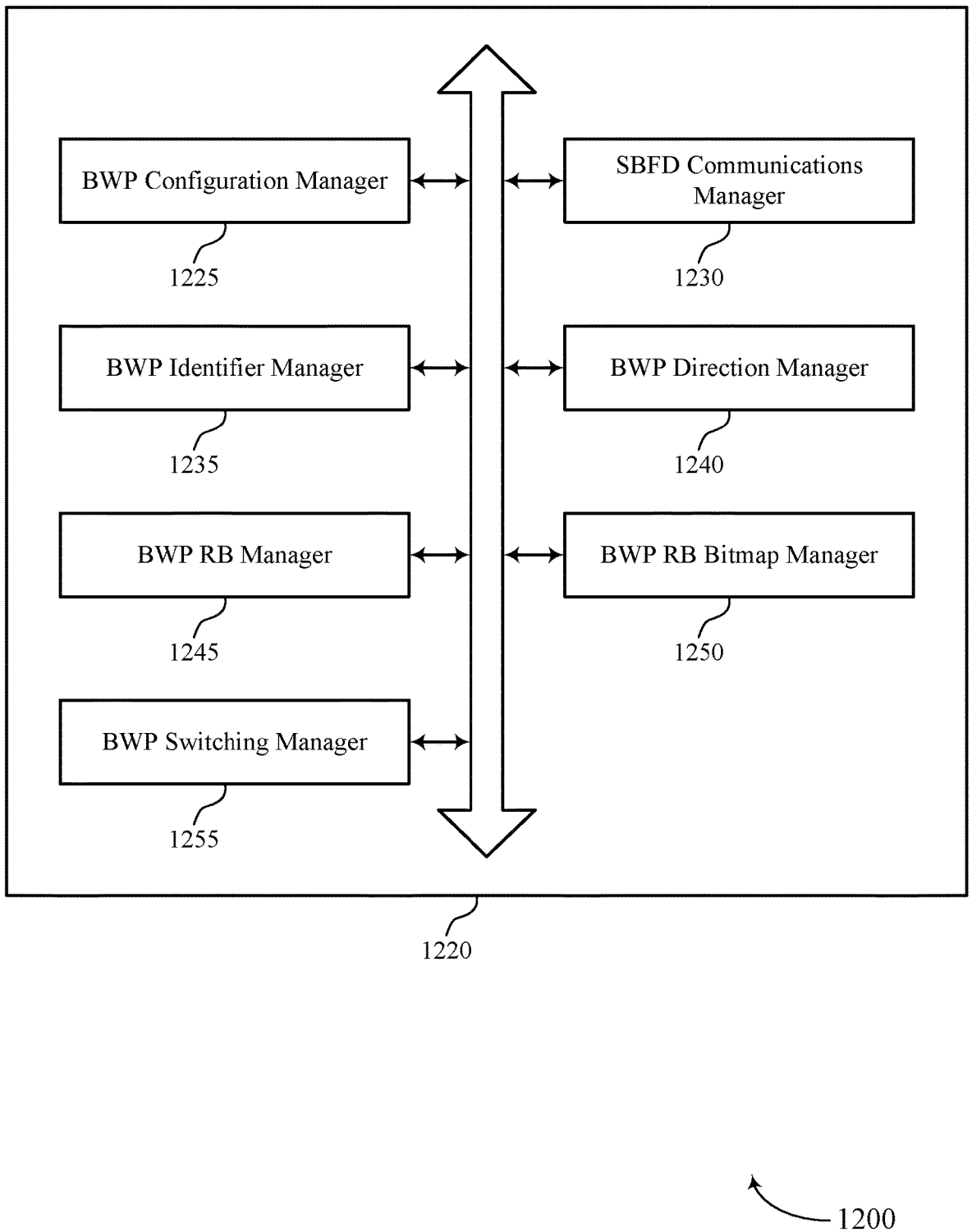
FIG. 12 shows a block diagram of a communications manager that supports non-contiguous RBs for BWP configuration in accordance with one or more aspects of the present disclosure.

FIG. 12 shows a block diagram 1200 of a communications manager 1220 that supports non-contiguous RBs for BWP configuration in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of non-contiguous RBs for BWP configuration as described herein. For example, the communications manager 1220 may include a BWP configuration manager 1225, an SBFD communications manager 1230, a BWP identifier manager 1235, a BWP direction manager 1240, a BWP RB manager 1245, a BWP RB bitmap manager 1250, a BWP switching manager 1255, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The BWP configuration manager 1225 may be configured as or otherwise support a means for outputting control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain. The SBFD communications manager 1230 may be configured as or otherwise support a means for communicate in a SBFD mode in the first communication direction via the first BWP and in the second communication direction via the second BWP.

In some examples, to support outputting the control signaling, the BWP identifier manager 1235 may be configured as or otherwise support a means for outputting an indication of a first identifier associated with the first BWP. In some examples, to support outputting the control signaling, the BWP direction manager 1240 may be configured as or otherwise support a means for outputting an indication that the first BWP is associated with the first communication direction. In some examples, to support outputting the control signaling, the BWP RB manager 1245 may be configured as or otherwise support a means for outputting, for the first BWP, an indication of the first set of RBs and the second set of RBs from a set of multiple RBs associated with at least one carrier bandwidth that includes the first BWP.

In some examples, to support outputting the control signaling, the BWP identifier manager 1235 may be configured as or otherwise support a means for outputting an indication of a second identifier associated with the second BWP. In some examples, to support outputting the control signaling, the BWP direction manager 1240 may be configured as or otherwise support a means for outputting an indication that the second BWP is associated with the second communication direction. In some examples, to support outputting the control signaling, the BWP RB manager 1245 may be configured as or otherwise support a means for outputting, for the second BWP, an indication of the third set of RBs from the set of multiple RBs.

In some examples, the first identifier is equal to the second identifier.

In some examples, the first identifier is different from the second identifier.

In some examples, to support outputting the control signaling, the BWP identifier manager 1235 may be configured as or otherwise support a means for outputting an indication of a first identifier associated with the first BWP. In some examples, to support outputting the control signaling, the BWP direction manager 1240 may be configured as or otherwise support a means for outputting an indication that the first BWP is associated with the first communication direction. In some examples, to support outputting the control signaling, the BWP RB manager 1245 may be configured as or otherwise support a means for outputting, for the first subband, an indication of a beginning RB index of the first set of RBs and a size in RBs of the first set of RBs. In some examples, to support outputting the control signaling, the BWP RB manager 1245 may be configured as or otherwise support a means for outputting, for the second subband, an indication of a beginning RB index of the second set of RBs and a size in RBs of the second set of RBs.

In some examples, to support outputting the control signaling, the BWP identifier manager 1235 may be configured as or otherwise support a means for outputting an indication of a second identifier associated with the second BWP. In some examples, to support outputting the control signaling, the BWP direction manager 1240 may be configured as or otherwise support a means for outputting an indication that the second BWP is associated with the first communication direction. In some examples, to support outputting the control signaling, the BWP RB manager 1245 may be configured as or otherwise support a means for outputting, for the second BWP, an indication of a beginning RB index of the third set of RBs and a size in RBs of the third set of RBs.

In some examples, to support outputting the control signaling, the BWP identifier manager 1235 may be configured as or otherwise support a means for outputting an indication of a first identifier associated with the first BWP. In some examples, to support outputting the control signaling, the BWP direction manager 1240 may be configured as or otherwise support a means for outputting an indication that the first BWP is associated with the first communication direction. In some examples, to support outputting the control signaling, the BWP RB bitmap manager 1250 may be configured as or otherwise support a means for outputting a bitmap for the first BWP indicating the first set of RBs and the second set of RBs.

In some examples, to support outputting the control signaling, the BWP identifier manager 1235 may be configured as or otherwise support a means for outputting an indication of a second identifier associated with the first BWP. In some examples, to support outputting the control signaling, the BWP direction manager 1240 may be configured as or otherwise support a means for outputting an indication that the second BWP is associated with the second communication direction. In some examples, to support outputting the control signaling, the BWP RB bitmap manager 1250 may be configured as or otherwise support a means for outputting a second bitmap for the second BWP indicating the third set of RBs.

In some examples, the BWP configuration manager 1225 may be configured as or otherwise support a means for outputting second control signaling indicating a set of BWPs, the set of BWPs including a first subset of BWPs associated with non-contiguous RBs and a second subset of BWPs associated with contiguous RBs, the first subset of BWPs including the first BWP and the second BWP, and where receiving the control signaling includes receiving an indication that a set of slots are associated with the first BWP and the second BWP.

In some examples, the BWP configuration manager 1225 may be configured as or otherwise support a means for outputting third control signaling updating RBs associated with at least one of the first BWP, the second BWP, a third BWP of the second subset of BWPs, or a fourth BWP of the second subset of BWPs, where the third BWP is associated with the first communication direction and where the fourth BWP is associated with the second communication direction, where the first subset of BWPs includes only the first BWP and the second BWP, and where the second subset of BWPs includes only the third BWP and the fourth BWP.

In some examples, the BWP configuration manager 1225 may be configured as or otherwise support a means for outputting third control signaling indicating another selected BWP from the set of BWPs for a second set of slots.

In some examples, the BWP RB manager 1245 may be configured as or otherwise support a means for outputting second control signaling updating RBs included in the first set of RBs, RBs included in the second set of RBs, RBs included in the third set of RBs, or a combination thereof.

In some examples, to support outputting the control signaling, the BWP switching manager 1255 may be configured as or otherwise support a means for outputting an indication of a first BWP configuration including the first BWP and the second BWP and a second BWP configuration for a half-duplex mode including a third BWP associated with the first communication direction and a fourth BWP associated with the second communication direction, where the control signaling further includes an indication of a time domain switching pattern between the first BWP configuration and the second BWP configuration.

In some examples, the time domain switching pattern includes a time gap between one or more slots associated with the first BWP configuration and one or more slots associated with the second BWP configuration.

In some examples, a first guard band is positioned between the first set of RBs and the third set of RBs in the frequency domain. In some examples, a second guard band is positioned between the third set of RBs and the second set of RBs in the frequency domain.

Figure 13:
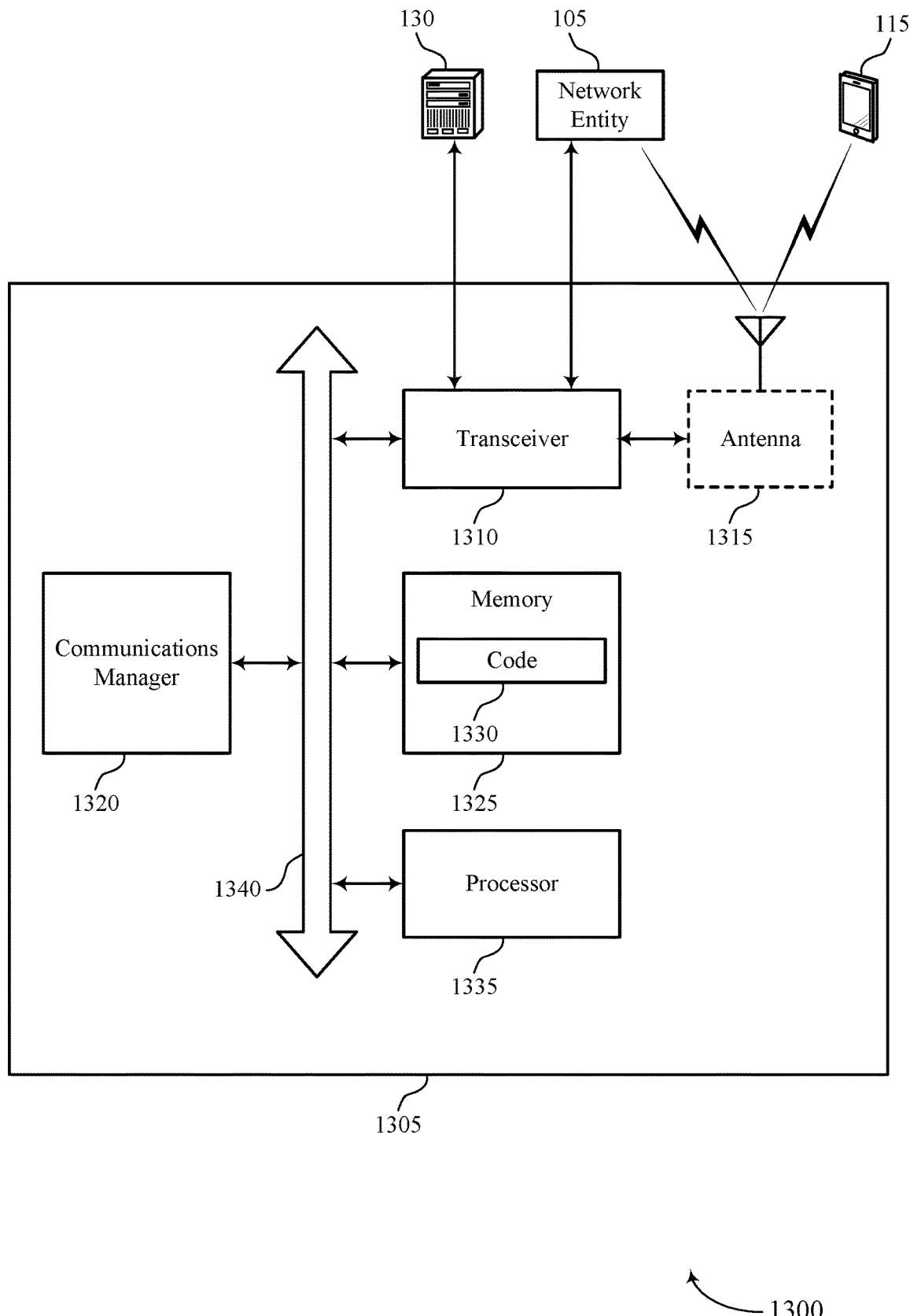
FIG. 13 shows a diagram of a system including a device that supports non-contiguous RBs for BWP configuration in accordance with one or more aspects of the present disclosure.

FIG. 13 shows a diagram of a system 1300 including a device 1305 that supports non-contiguous RBs for BWP configuration in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting non-contiguous RBs for BWP configuration). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for outputting control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain. The communications manager 1320 may be configured as or otherwise support a means for communicating in a SBFD mode in the first communication direction via the first BWP and in the second communication direction via the second BWP.

By including or configuring the communications manager 1320 in accordance with examples as described herein, the device 1305 may support techniques for more efficient utilization of communication resources and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of non-contiguous RBs for BWP configuration as described herein, or the processor 1335 and the memory 1325 may be otherwise configured to perform or support such operations.

Figure 14:
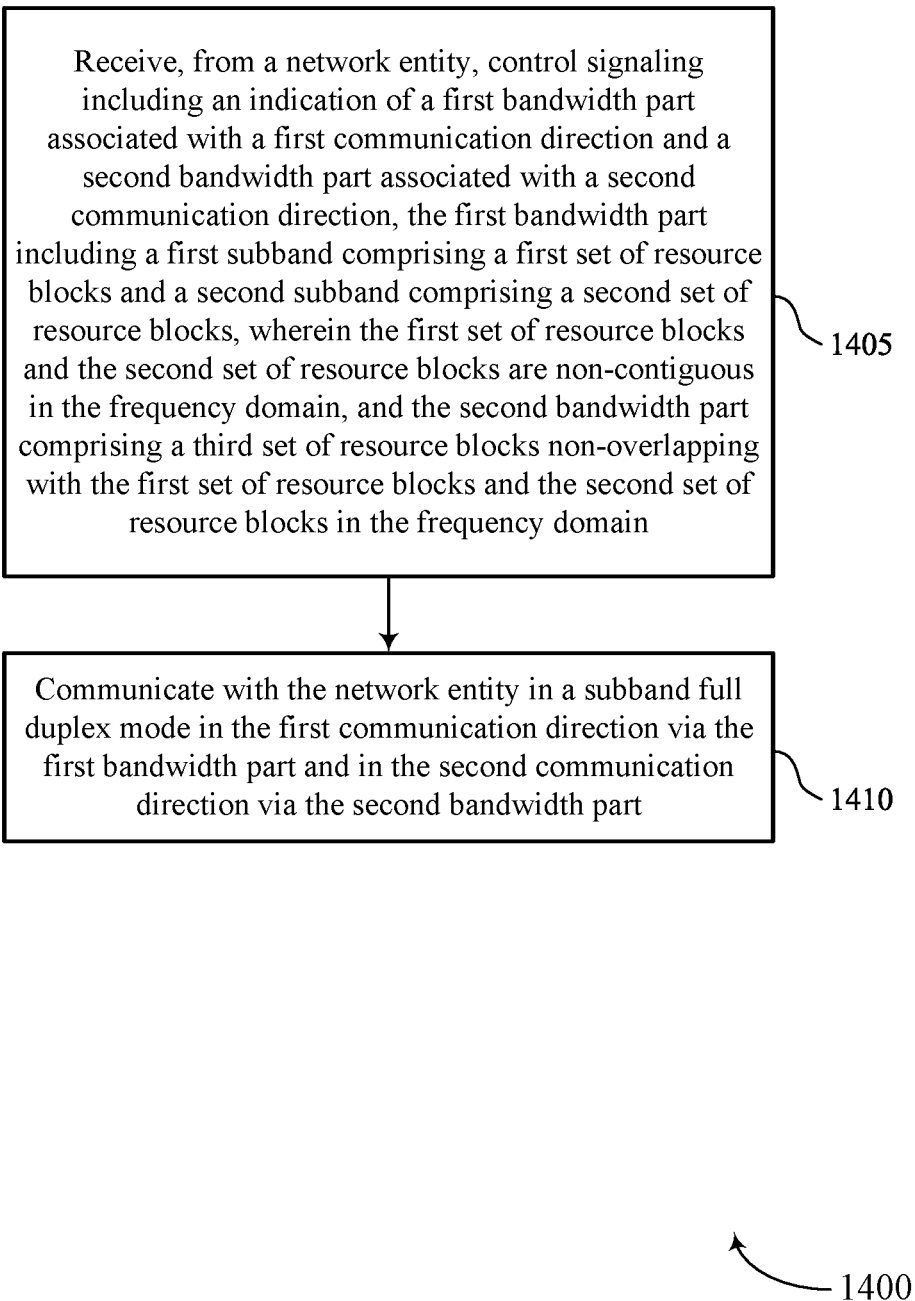
FIGS. 14 through 17 show flowcharts illustrating methods that support non-contiguous RBs for BWP configuration in accordance with one or more aspects of the present disclosure.

FIG. 14 shows a flowchart illustrating a method 1400 that supports non-contiguous RBs for BWP configuration in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain. The operations of 1405 may be performed in accordance with examples as disclosed herein. In some examples, aspects of the operations of 1405 may be performed by a BWP configuration manager 825 as described with reference to FIG. 8.

At 1410, the method may include communicating with the network entity in a SBFD mode in the first communication direction via the first BWP and in the second communication direction via the second BWP. The operations of 1410 may be performed in accordance with examples as disclosed herein. In some examples, aspects of the operations of 1410 may be performed by an SBFD communications manager 830 as described with reference to FIG. 8.

Figure 15:
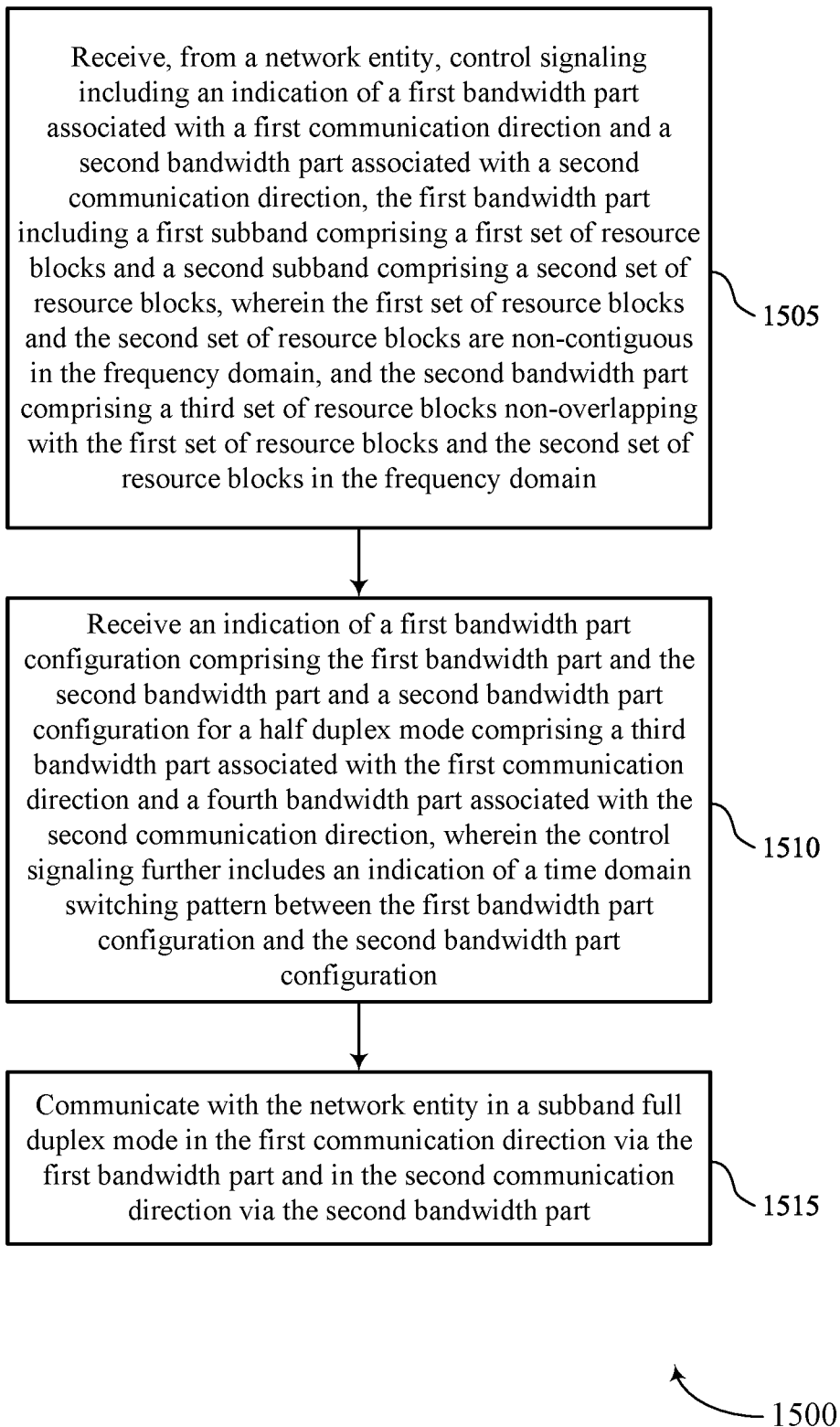

FIG. 15 shows a flowchart illustrating a method 1500 that supports non-contiguous RBs for BWP configuration in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain. The operations of 1505 may be performed in accordance with examples as disclosed herein. In some examples, aspects of the operations of 1505 may be performed by a BWP configuration manager 825 as described with reference to FIG. 8.

At 1510, the method may include receiving an indication of a first BWP configuration including the first BWP and the second BWP and a second BWP configuration for a half-duplex mode including a third BWP associated with the first communication direction and a fourth BWP associated with the second communication direction, where the control signaling further includes an indication of a time domain switching pattern between the first BWP configuration and the second BWP configuration. The operations of 1510 may be performed in accordance with examples as disclosed herein. In some examples, aspects of the operations of 1510 may be performed by a BWP switching manager 855 as described with reference to FIG. 8.

At 1515, the method may include communicating with the network entity in a SBFD mode in the first communication direction via the first BWP and in the second communication direction via the second BWP. The operations of 1515 may be performed in accordance with examples as disclosed herein. In some examples, aspects of the operations of 1515 may be performed by an SBFD communications manager 830 as described with reference to FIG. 8.

Figure 16:
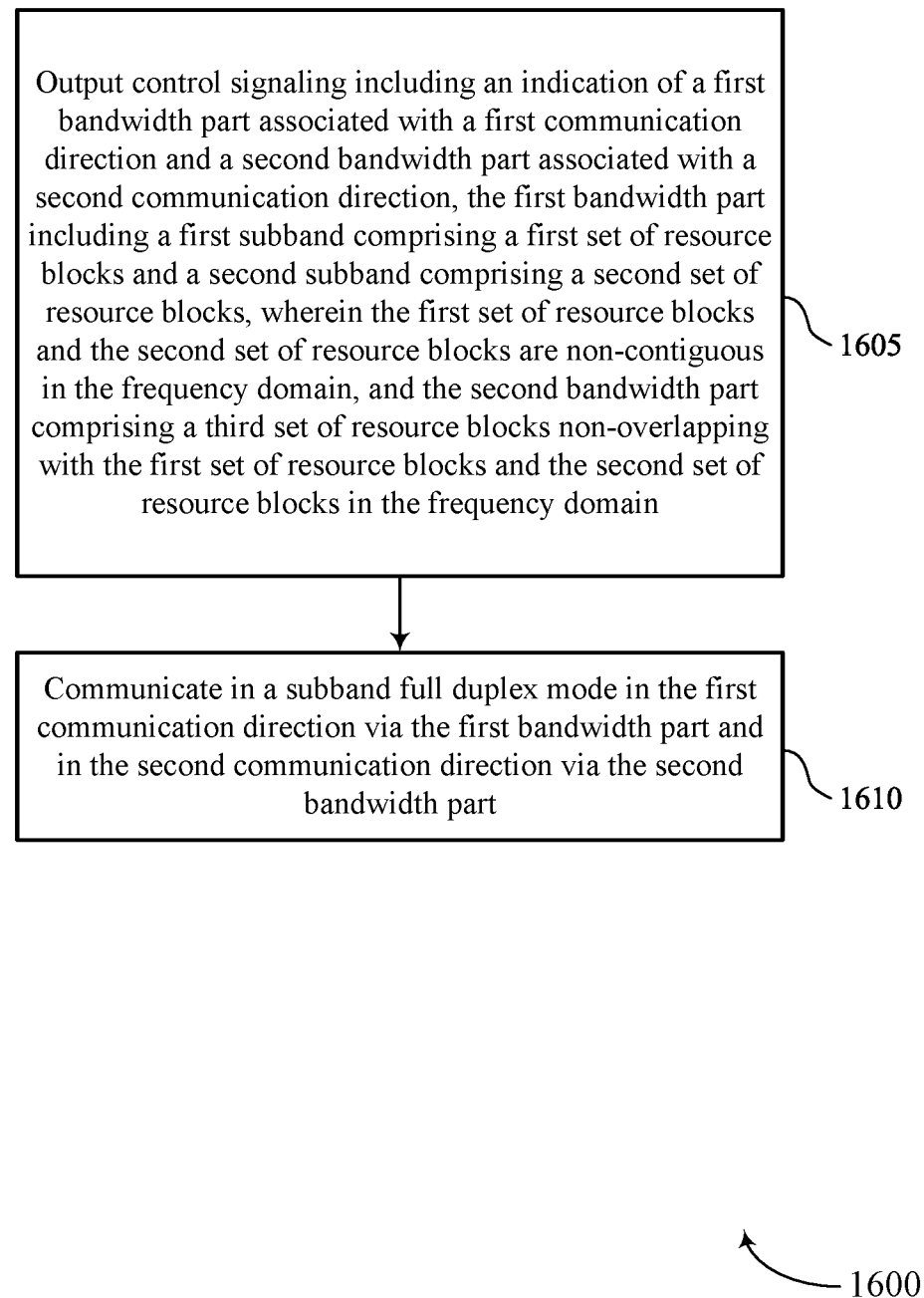

FIG. 16 shows a flowchart illustrating a method 1600 that supports non-contiguous RBs for BWP configuration in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include outputting control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain. The operations of 1605 may be performed in accordance with examples as disclosed herein. In some examples, aspects of the operations of 1605 may be performed by a BWP configuration manager 1225 as described with reference to FIG. 12.

At 1610, the method may include communicate in a SBFD mode in the first communication direction via the first BWP and in the second communication direction via the second BWP. The operations of 1610 may be performed in accordance with examples as disclosed herein. In some examples, aspects of the operations of 1610 may be performed by an SBFD communications manager 1230 as described with reference to FIG. 12.

Figure 17:
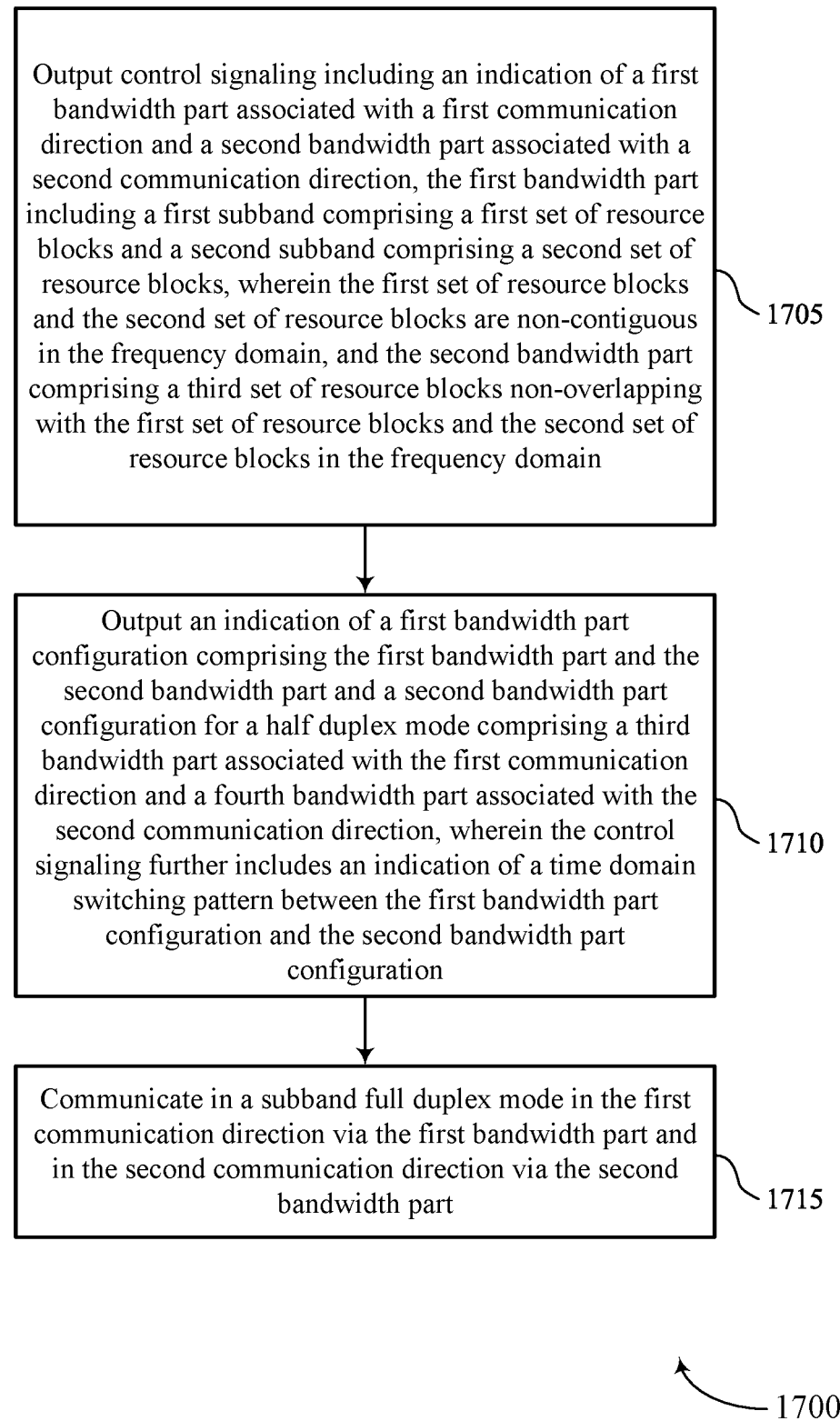

FIG. 17 shows a flowchart illustrating a method 1700 that supports non-contiguous RBs for BWP configuration in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting control signaling including an indication of a first BWP associated with a first communication direction and a second BWP associated with a second communication direction, the first BWP including a first subband including a first set of RBs and a second subband including a second set of RBs, where the first set of RBs and the second set of RBs are non-contiguous in the frequency domain, and the second BWP including a third set of RBs non-overlapping with the first set of RBs and the second set of RBs in the frequency domain. The operations of 1705 may be performed in accordance with examples as disclosed herein. In some examples, aspects of the operations of 1705 may be performed by a BWP configuration manager 1225 as described with reference to FIG. 12.

At 1710, the method may include outputting an indication of a first BWP configuration including the first BWP and the second BWP and a second BWP configuration for a half-duplex mode including a third BWP associated with the first communication direction and a fourth BWP associated with the second communication direction, where the control signaling further includes an indication of a time domain switching pattern between the first BWP configuration and the second BWP configuration. The operations of 1710 may be performed in accordance with examples as disclosed herein. In some examples, aspects of the operations of 1710 may be performed by a BWP switching manager 1255 as described with reference to FIG. 12.

At 1715, the method may include communicate in a SBFD mode in the first communication direction via the first BWP and in the second communication direction via the second BWP. The operations of 1715 may be performed in accordance with examples as disclosed herein. In some examples, aspects of the operations of 1715 may be performed by an SBFD communications manager 1230 as described with reference to FIG. 12.

The following provides an overview of aspects of the present disclosure:

Aspect 1: A method for wireless communications at a UE, comprising: receiving, from a network entity, control signaling including an indication of a first BWP associated with a first communication direction and a second BWP associated with a second communication direction, the first BWP including a first subband comprising a first set of RBs and a second subband comprising a second set of RBs, wherein the first set of RBs and the second set of RBs are non-contiguous in the frequency domain, and the second BWP comprising a third set of RBs non-overlapping with the first set of RBs and the second set of RBs in the frequency domain; and communicating with the network entity in a SBFD mode in the first communication direction via the first BWP and in the second communication direction via the second BWP.

Aspect 2: The method of aspect 1, wherein receiving the control signaling comprises: receiving an indication of a first identifier associated with the first BWP; receiving an indication that the first BWP is associated with the first communication direction; and receiving, for the first BWP, an indication of the first set of RBs and the second set of RBs from a plurality of RBs associated with at least one carrier bandwidth that includes the first BWP.

Aspect 3: The method of aspect 2, wherein receiving the control signaling comprises: receiving an indication of a second identifier associated with the second BWP; receiving an indication that the second BWP is associated with the second communication direction; and receiving, for the second BWP, an indication of the third set of RBs from the plurality of RBs.

Aspect 4: The method of aspect 3, wherein the first identifier is equal to the second identifier.

Aspect 5: The method of any of aspects 3 through 4, wherein the first identifier is different from the second identifier.

Aspect 6: The method of aspect 1, wherein receiving the control signaling comprises: receiving an indication of a first identifier associated with the first BWP; receiving an indication that the first BWP is associated with the first communication direction; receiving, for the first subband, an indication of a beginning RB index of the first set of RBs and a size in RBs of the first set of RBs; and receiving, for the second subband, an indication of a beginning RB index of the second set of RBs and a size in RBs of the second set of RBs.

Aspect 7: The method of aspect 6, wherein receiving the control signaling comprises: receiving an indication of a second identifier associated with the second BWP; receiving an indication that the second BWP is associated with the first communication direction; and receiving, for the second BWP, an indication of a beginning RB index of the third set of RBs and a size in RBs of the third set of RBs.

Aspect 8: The method of aspect 1, wherein receiving the control signaling comprises: receiving an indication of a first identifier associated with the first BWP; receiving an indication that the first BWP is associated with the first communication direction; and receiving a bitmap for the first BWP indicating the first set of RBs and the second set of RBs.

Aspect 9: The method of aspect 8, wherein receiving the control signaling comprises: receiving an indication of a second identifier associated with the first BWP; receiving an indication that the second BWP is associated with the second communication direction; and receiving a second bitmap for the second BWP indicating the third set of RBs.

Aspect 10: The method of any of aspects 1 through 9, further comprising: receiving second control signaling indicating a set of BWPs, the set of BWPs including a first subset of BWPs associated with non-contiguous RBs and a second subset of BWPs associated with contiguous RBs, the first subset of BWPs including the first BWP and the second BWP, and wherein receiving the control signaling comprises receiving an indication that a set of slots are associated with the first BWP and the second BWP.

Aspect 11: The method of aspect 10, further comprising: receiving third control signaling updating RBs associated with at least one of the first BWP, the second BWP, a third BWP of the second subset of BWPs, or a fourth BWP of the second subset of BWPs, wherein the third BWP is associated with the first communication direction and wherein the fourth BWP is associated with the second communication direction, wherein the first subset of BWPs comprises only the first BWP and the second BWP, and wherein the second subset of BWPs comprises only the third BWP and the fourth BWP.

Aspect 12: The method of any of aspects 10 through 11, further comprising: receiving third control signaling indicating another selected BWP from the set of BWPs for a second set of slots.

Aspect 13: The method of any of aspects 1 through 12, further comprising: receiving second control signaling updating RBs included in the first set of RBs, RBs included in the second set of RBs, RBs included in the third set of RBs, or a combination thereof.

Aspect 14: The method of any of aspects 1 through 13, wherein receiving the control signaling comprises: receiving an indication of a first BWP configuration comprising the first BWP and the second BWP and a second BWP configuration for a half-duplex mode comprising a third BWP associated with the first communication direction and a fourth BWP associated with the second communication direction, wherein the control signaling further includes an indication of a time domain switching pattern between the first BWP configuration and the second BWP configuration.

Aspect 15: The method of aspect 14, wherein the time domain switching pattern comprises a time gap between one or more slots associated with the first BWP configuration and one or more slots associated with the second BWP configuration.

Aspect 16: The method of any of aspects 1 through 15, wherein a first guard band is positioned between the first set of RBs and the third set of RBs in the frequency domain, and a second guard band is positioned between the third set of RBs and the second set of RBs in the frequency domain.

Aspect 17: A method for wireless communications at a network entity, comprising: outputting control signaling including an indication of a first BWP associated with a first communication direction and a second BWP associated with a second communication direction, the first BWP including a first subband comprising a first set of RBs and a second subband comprising a second set of RBs, wherein the first set of RBs and the second set of RBs are non-contiguous in the frequency domain, and the second BWP comprising a third set of RBs non-overlapping with the first set of RBs and the second set of RBs in the frequency domain; and communicate in a SBFD mode in the first communication direction via the first BWP and in the second communication direction via the second BWP.

Aspect 18: The method of aspect 17, wherein outputting the control signaling comprises: outputting an indication of a first identifier associated with the first BWP; outputting an indication that the first BWP is associated with the first communication direction; and outputting, for the first BWP, an indication of the first set of RBs and the second set of RBs from a plurality of RBs associated with at least one carrier bandwidth that includes the first BWP.

Aspect 19: The method of aspect 18, wherein outputting the control signaling comprises: outputting an indication of a second identifier associated with the second BWP; outputting an indication that the second BWP is associated with the second communication direction; and outputting, for the second BWP, an indication of the third set of RBs from the plurality of RBs.

Aspect 20: The method of aspect 19, wherein the first identifier is equal to the second identifier.

Aspect 21: The method of any of aspects 19 through 20, wherein the first identifier is different from the second identifier.

Aspect 22: The method of aspect 17, wherein outputting the control signaling comprises: outputting an indication of a first identifier associated with the first BWP; outputting an indication that the first BWP is associated with the first communication direction; outputting, for the first subband, an indication of a beginning RB index of the first set of RBs and a size in RBs of the first set of RBs; and outputting, for the second subband, an indication of a beginning RB index of the second set of RBs and a size in RBs of the second set of RBs.

Aspect 23: The method of aspect 22, wherein outputting the control signaling comprises: outputting an indication of a second identifier associated with the second BWP; outputting an indication that the second BWP is associated with the first communication direction; and outputting, for the second BWP, an indication of a beginning RB index of the third set of RBs and a size in RBs of the third set of RBs.

Aspect 24: The method of aspect 17, wherein outputting the control signaling comprises: outputting an indication of a first identifier associated with the first BWP; outputting an indication that the first BWP is associated with the first communication direction; and outputting a bitmap for the first BWP indicating the first set of RBs and the second set of RBs.

Aspect 25: The method of aspect 24, wherein outputting the control signaling comprises: outputting an indication of a second identifier associated with the first BWP; outputting an indication that the second BWP is associated with the second communication direction; and outputting a second bitmap for the second BWP indicating the third set of RBs.

Aspect 26: The method of any of aspects 17 through 25, further comprising: outputting second control signaling indicating a set of BWPs, the set of BWPs including a first subset of BWPs associated with non-contiguous RBs and a second subset of BWPs associated with contiguous RBs, the first subset of BWPs including the first BWP and the second BWP, and wherein receiving the control signaling comprises receiving an indication that a set of slots are associated with the first BWP and the second BWP.

Aspect 27: The method of aspect 26, further comprising: outputting third control signaling updating RBs associated with at least one of the first BWP, the second BWP, a third BWP of the second subset of BWPs, or a fourth BWP of the second subset of BWPs, wherein the third BWP is associated with the first communication direction and wherein the fourth BWP is associated with the second communication direction, wherein the first subset of BWPs comprises only the first BWP and the second BWP, and wherein the second subset of BWPs comprises only the third BWP and the fourth BWP.

Aspect 28: The method of any of aspects 26 through 27, further comprising: outputting third control signaling indicating another selected BWP from the set of BWPs for a second set of slots.

Aspect 29: The method of any of aspects 17 through 28, further comprising: outputting second control signaling updating RBs included in the first set of RBs, RBs included in the second set of RBs, RBs included in the third set of RBs, or a combination thereof.

Aspect 30: The method of any of aspects 17 through 29, wherein outputting the control signaling comprises: outputting an indication of a first BWP configuration comprising the first BWP and the second BWP and a second BWP configuration for a half-duplex mode comprising a third BWP associated with the first communication direction and a fourth BWP associated with the second communication direction, wherein the control signaling further includes an indication of a time domain switching pattern between the first BWP configuration and the second BWP configuration.

Aspect 31: The method of aspect 30, wherein the time domain switching pattern comprises a time gap between one or more slots associated with the first BWP configuration and one or more slots associated with the second BWP configuration.

Aspect 32: The method of any of aspects 17 through 31, wherein a first guard band is positioned between the first set of RBs and the third set of RBs in the frequency domain, and a second guard band is positioned between the third set of RBs and the second set of RBs in the frequency domain.

Aspect 33: An apparatus for wireless communications at a UE, comprising a processor; memory coupled with the processor; and instructions stored in the memory and executable by the processor to cause the apparatus to perform a method of any of aspects 1 through 16.

Aspect 34: An apparatus for wireless communications at a UE, comprising at least one means for performing a method of any of aspects 1 through 16.

Aspect 35: A non-transitory computer-readable medium storing code for wireless communications at a UE, the code comprising instructions executable by a processor to perform a method of any of aspects 1 through 16.

Aspect 36: An apparatus for wireless communications at a network entity, comprising a processor; memory coupled with the processor; and instructions stored in the memory and executable by the processor to cause the apparatus to perform a method of any of aspects 17 through 32.

Aspect 37: An apparatus for wireless communications at a network entity, comprising at least one means for performing a method of any of aspects 17 through 32.

Aspect 38: A non-transitory computer-readable medium storing code for wireless communications at a network entity, the code comprising instructions executable by a processor to perform a method of any of aspects 17 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving, from a network entity, control signaling including an indication of a first identifier associated with a first bandwidth part associated with a first communication direction and a second identifier associated with a second bandwidth part associated with a second communication direction, the first bandwidth part including a first subband comprising a first set of resource blocks and a second subband comprising a second set of resource blocks, wherein the first set of resource blocks and the second set of resource blocks are non-contiguous in the frequency domain, and the second bandwidth part comprising a third set of resource blocks non-overlapping with the first set of resource blocks and the second set of resource blocks in the frequency domain; and
communicating with the network entity in a subband full-duplex mode, wherein the UE communicates simultaneously in the first communication direction via the first bandwidth part and in the second communication direction via the second bandwidth part.

2. The method of claim 1, wherein receiving the control signaling comprises:
receiving an indication that the first bandwidth part is associated with the first communication direction; and
receiving, for the first bandwidth part, an indication of the first set of resource blocks and the second set of resource blocks from a plurality of resource blocks associated with at least one carrier bandwidth that includes the first bandwidth part.

3. The method of claim 2, wherein receiving the control signaling comprises:
receiving an indication that the second bandwidth part is associated with the second communication direction; and
receiving, for the second bandwidth part, an indication of the third set of resource blocks from the plurality of resource blocks.

4. The method of claim 1, wherein the first identifier is equal to the second identifier.

5. The method of claim 1, wherein the first identifier is different from the second identifier.

6. The method of claim 1, wherein receiving the control signaling comprises:
receiving an indication that the first bandwidth part is associated with the first communication direction;
receiving, for the first subband, an indication of a beginning resource block index of the first set of resource blocks and a size in resource blocks of the first set of resource blocks; and
receiving, for the second subband, an indication of a beginning resource block index of the second set of resource blocks and a size in resource blocks of the second set of resource blocks.

7. The method of claim 6, wherein receiving the control signaling comprises:
receiving an indication that the second bandwidth part is associated with the first communication direction; and
receiving, for the second bandwidth part, an indication of a beginning resource block index of the third set of resource blocks and a size in resource blocks of the third set of resource blocks.

8. The method of claim 1, wherein receiving the control signaling comprises:
receiving an indication that the first bandwidth part is associated with the first communication direction; and
receiving a bitmap that indicates the first set of resource blocks and the second set of resource blocks included within the first bandwidth part.

9. The method of claim 8, wherein receiving the control signaling comprises:
receiving an indication that the second bandwidth part is associated with the second communication direction; and
receiving a second bitmap for the second bandwidth part indicating the third set of resource blocks.

10. The method of claim 1, further comprising:
receiving second control signaling indicating a set of bandwidth parts, the set of bandwidth parts including a first subset of bandwidth parts associated with non-contiguous resource blocks and a second subset of bandwidth parts associated with contiguous resource blocks, the first subset of bandwidth parts including the first bandwidth part and the second bandwidth part, and wherein receiving the control signaling comprises receiving an indication that a set of slots are associated with the first bandwidth part and the second bandwidth part.

11. The method of claim 10, further comprising:
receiving third control signaling updating resource blocks associated with at least one of the first bandwidth part, the second bandwidth part, a third bandwidth part of the second subset of bandwidth parts, or a fourth bandwidth part of the second subset of bandwidth parts, wherein the third bandwidth part is associated with the first communication direction and wherein the fourth bandwidth part is associated with the second communication direction, wherein the first subset of bandwidth parts comprises only the first bandwidth part and the second bandwidth part, and wherein the second subset of bandwidth parts comprises only the third bandwidth part and the fourth bandwidth part.

12. The method of claim 10, further comprising:
receiving third control signaling indicating another selected bandwidth part from the set of bandwidth parts for a second set of slots.

13. The method of claim 1, further comprising:
receiving second control signaling updating resource blocks included in the first set of resource blocks, resource blocks included in the second set of resource blocks, resource blocks included in the third set of resource blocks, or a combination thereof.

14. The method of claim 1, wherein receiving the control signaling comprises:
receiving an indication of a first bandwidth part configuration comprising the first bandwidth part and the second bandwidth part and a second bandwidth part configuration for a half-duplex mode comprising a third bandwidth part associated with the first communication direction and a fourth bandwidth part associated with the second communication direction, wherein the control signaling further includes an indication of a time domain switching pattern between the first bandwidth part configuration and the second bandwidth part configuration.

15. The method of claim 14, wherein the time domain switching pattern comprises a time gap between one or more slots associated with the first bandwidth part configuration and one or more slots associated with the second bandwidth part configuration.

16. The method of claim 1, wherein:
a first guard band is positioned between the first set of resource blocks and the third set of resource blocks in the frequency domain, and
a second guard band is positioned between the third set of resource blocks and the second set of resource blocks in the frequency domain.

17. A method for wireless communications at a network entity, comprising:
outputting control signaling including an indication of a first identifier associated with a first bandwidth part associated with a first communication direction and a second identifier associated with a second bandwidth part associated with a second communication direction, the first bandwidth part including a first subband comprising a first set of resource blocks and a second subband comprising a second set of resource blocks, wherein the first set of resource blocks and the second set of resource blocks are non-contiguous in the frequency domain, and the second bandwidth part comprising a third set of resource blocks non-overlapping with the first set of resource blocks and the second set of resource blocks in the frequency domain; and
communicate in a subband full-duplex mode, wherein the network entity communicates with a UE simultaneously in the first communication direction via the first bandwidth part and in the second communication direction via the second bandwidth part.

18. The method of claim 17, wherein outputting the control signaling comprises:
outputting an indication that the first bandwidth part is associated with the first communication direction; and
outputting, for the first bandwidth part, an indication of the first set of resource blocks and the second set of resource blocks from a plurality of resource blocks associated with at least one carrier bandwidth that includes the first bandwidth part.

19. The method of claim 18, wherein outputting the control signaling comprises:
outputting an indication that the second bandwidth part is associated with the second communication direction; and
outputting, for the second bandwidth part, an indication of the third set of resource blocks from the plurality of resource blocks.

20. The method of claim 17, wherein outputting the control signaling comprises:
outputting an indication that the first bandwidth part is associated with the first communication direction;
outputting, for the first subband, an indication of a beginning resource block index of the first set of resource blocks and a size in resource blocks of the first set of resource blocks; and
outputting, for the second subband, an indication of a beginning resource block index of the second set of resource blocks and a size in resource blocks of the second set of resource blocks.

21. The method of claim 20, wherein outputting the control signaling comprises:
outputting an indication that the second bandwidth part is associated with the first communication direction; and
outputting, for the second bandwidth part, an indication of a beginning resource block index of the third set of resource blocks and a size in resource blocks of the third set of resource blocks.

22. The method of claim 17, wherein outputting the control signaling comprises:
outputting an indication that the first bandwidth part is associated with the first communication direction; and
outputting a bitmap that indicates the first set of resource blocks and the second set of resource blocks included within the first bandwidth part.

23. The method of claim 22, wherein outputting the control signaling comprises:
outputting an indication that the second bandwidth part is associated with the second communication direction; and
outputting a second bitmap for the second bandwidth part indicating the third set of resource blocks.

24. The method of claim 17, further comprising:
outputting second control signaling indicating a set of bandwidth parts, the set of bandwidth parts including a first subset of bandwidth parts associated with non-contiguous resource blocks and a second subset of bandwidth parts associated with contiguous resource blocks, the first subset of bandwidth parts including the first bandwidth part and the second bandwidth part, and wherein receiving the control signaling comprises receiving an indication that a set of slots are associated with the first bandwidth part and the second bandwidth part.

25. The method of claim 24, further comprising:
outputting third control signaling updating resource blocks associated with at least one of the first bandwidth part, the second bandwidth part, a third bandwidth part of the second subset of bandwidth parts, or a fourth bandwidth part of the second subset of bandwidth parts, wherein the third bandwidth part is associated with the first communication direction and wherein the fourth bandwidth part is associated with the second communication direction, wherein the first subset of bandwidth parts comprises only the first bandwidth part and the second bandwidth part, and wherein the second subset of bandwidth parts comprises only the third bandwidth part and the fourth bandwidth part.

26. The method of claim 24, further comprising:
outputting third control signaling indicating another selected bandwidth part from the set of bandwidth parts for a second set of slots.

27. The method of claim 17, further comprising:
outputting second control signaling updating resource blocks included in the first set of resource blocks, resource blocks included in the second set of resource blocks, resource blocks included in the third set of resource blocks, or a combination thereof.

28. The method of claim 17, wherein outputting the control signaling comprises:
outputting an indication of a first bandwidth part configuration comprising the first bandwidth part and the second bandwidth part and a second bandwidth part configuration for a half-duplex mode comprising a third bandwidth part associated with the first communication direction and a fourth bandwidth part associated with the second communication direction, wherein the control signaling further includes an indication of a time domain switching pattern between the first bandwidth part configuration and the second bandwidth part configuration.

29. An apparatus for wireless communications at a user equipment (UE), comprising:
one or more processors;
memory coupled with the one or more processors; and
instructions stored in the memory and executable by the one or more processors to cause the apparatus to:
receive, from a network entity, control signaling including an indication of a first identifier associated with a first bandwidth part associated with a first communication direction and a second identifier associated with a second bandwidth part associated with a second communication direction, the first bandwidth part including a first subband comprising a first set of resource blocks and a second subband comprising a second set of resource blocks, wherein the first set of resource blocks and the second set of resource blocks are non-contiguous in the frequency domain, and the second bandwidth part comprising a third set of resource blocks non-overlapping with the first set of resource blocks and the second set of resource blocks in the frequency domain; and
communicate with the network entity in a subband full-duplex mode, wherein the UE communicates simultaneously in the first communication direction via the first bandwidth part and in the second communication direction via the second bandwidth part.

30. An apparatus for wireless communications at a network entity, comprising:
one or more processors;
memory coupled with the one or more processors; and
instructions stored in the memory and executable by the one or more processors to cause the apparatus to:
output control signaling including an indication of a first identifier associated with a first bandwidth part associated with a first communication direction and a second identifier associated with a second bandwidth part associated with a second communication direction, the first bandwidth part including a first subband comprising a first set of resource blocks and a second subband comprising a second set of resource blocks, wherein the first set of resource blocks and the second set of resource blocks are non-contiguous in the frequency domain, and the second bandwidth part comprising a third set of resource blocks non-overlapping with the first set of resource blocks and the second set of resource blocks in the frequency domain; and
communicate in a subband full-duplex mode, wherein the network entity communicates with a UE simultaneously in the first communication direction via the first bandwidth part and in the second communication direction via the second bandwidth part.

\* \* \* \* \*